(12) United States Patent
Iwasaki et al.

(10) Patent No.: US 10,807,903 B2
(45) Date of Patent: Oct. 20, 2020

(54) NANOCOMPOSITES AND METHOD OF MANUFACTURING NANOCOMPOSITES

(71) Applicant: KOITO MANUFACTURING CO., LTD., Tokyo (JP)

(72) Inventors: Takeshi Iwasaki, Shizuoka (JP); Hisayoshi Daicho, Shizuoka (JP); Yu Shinomiya, Shizuoka (JP)

(73) Assignee: KOITO MANUFACTURING CO., LTD., Minato-Ku, Tokyo (JP)

( * ) Notice: Subject to any disclaimer, the term of this patent is extended or adjusted under 35 U.S.C. 154(b) by 71 days.

(21) Appl. No.: 16/159,683

(22) Filed: Oct. 14, 2018

(65) Prior Publication Data

US 2019/0047903 A1 Feb. 14, 2019

Related U.S. Application Data

(63) Continuation of application No. PCT/JP2017/014939, filed on Apr. 12, 2017.

(30) Foreign Application Priority Data

Apr. 15, 2016 (JP) .................. 2016-081918
Mar. 28, 2017 (JP) .................. 2017-062297

(51) Int. Cl.
*H01B 1/06* (2006.01)
*C03C 4/12* (2006.01)
(Continued)

(52) U.S. Cl.
CPC ............. *C03C 4/12* (2013.01); *C03C 3/06* (2013.01); *C03C 10/0009* (2013.01);
(Continued)

(58) Field of Classification Search
CPC ..... C03C 4/12; C03C 21/008; C03C 10/0009; C03C 14/006; C03C 3/06; C03C 2214/16;
(Continued)

(56) References Cited

U.S. PATENT DOCUMENTS 3,522,189 A * 7/1970 Lee, Jr. .............. C09K 11/7749
   252/301.4 F
3,634,711 A * 1/1972 Barber ...................... C03C 3/06
   313/468

(Continued)

FOREIGN PATENT DOCUMENTS

| JP | 2001119075 | 4/2001 |
|----|------------|--------|
| JP | 2006103991 | 4/2006 |

(Continued)

OTHER PUBLICATIONS

Extended European Search Report and Opinion dated Oct. 16, 2019 in corresponding European Patent Application No. 17782422-4-1105, 10 pages.

(Continued)

*Primary Examiner* — Mark Kopec
*Assistant Examiner* — Jaison P Thomas
(74) *Attorney, Agent, or Firm* — Buchanan Ingersoll & Rooney PC

(57) ABSTRACT

A nanocomposite includes: a matrix phase; and a functional area disposed in the matrix phase. The functional area contains monocrystal fine particles.

8 Claims, 20 Drawing Sheets

(51) Int. Cl.

| | |
|---|---|
| *C03C 3/06* | (2006.01) |
| *C03C 21/00* | (2006.01) |
| *C09K 11/02* | (2006.01) |
| *C09K 11/77* | (2006.01) |
| *C03C 10/00* | (2006.01) |
| *C03C 14/00* | (2006.01) |
| *C09K 11/88* | (2006.01) |
| *C09K 11/56* | (2006.01) |
| *C09K 11/61* | (2006.01) |

(52) U.S. Cl.
CPC .......... *C03C 14/006* (2013.01); *C03C 21/008* (2013.01); *C09K 11/02* (2013.01); *C09K 11/562* (2013.01); *C09K 11/611* (2013.01); *C09K 11/779* (2013.01); *C09K 11/7731* (2013.01); *C09K 11/7733* (2013.01); *C09K 11/7795* (2013.01); *C09K 11/881* (2013.01); *C09K 11/883* (2013.01); *H01B 1/06* (2013.01); *C03C 2214/16* (2013.01)

(58) Field of Classification Search
CPC . C09K 11/02; C09K 11/7795; C09K 11/7733; C09K 11/7731; C09K 11/883; C09K 11/779; C09K 11/562; C09K 11/611; C09K 11/881; H01B 1/06
See application file for complete search history.

(56) References Cited

U.S. PATENT DOCUMENTS

| | | | | |
|---|---|---|---|---|
| 6,774,560 | B1 | 8/2004 | Smith et al. | |
| 7,800,302 | B2 | 9/2010 | Choi et al. | |
| 2005/0008875 | A1 | 1/2005 | Taketomi et al. | |
| 2006/0037366 | A1* | 2/2006 | Chen | C03C 3/06 65/399 |
| 2016/0225963 | A1* | 8/2016 | Yoshimura | C03C 14/006 |
| 2017/0066963 | A1* | 3/2017 | Nick | C03B 19/106 |
| 2019/0113635 | A1* | 4/2019 | Daicho | G01T 1/2023 |

FOREIGN PATENT DOCUMENTS

| | | |
|---|---|---|
| JP | 2006229134 | 8/2006 |
| JP | 2008208380 | 9/2008 |
| JP | 2009530452 | 8/2009 |
| JP | 2010509735 | 3/2010 |
| JP | 2014521206 | 8/2014 |
| JP | 2015224299 | 12/2015 |

OTHER PUBLICATIONS

Itoh, M. et al. "Time-resolved luminescence study of CaF2:Eu2+ nanocrystals in glass-ceramics", Journal of Luminescence, Elsevier BV North-Holland, NL., vol. 112, No. 1-4, Oct. 14, 2004, pp. 161-165.

Jie Fu et al., "Scintillation from Eu2+ in Nanocrystallized Glass", Journal of American Ceramic Society, vol. 92, No. 9, Aug. 31, 2009, pp. 2119-2121.

Nicolai R. Kulish et al. "Optical properties of quasi-zero-dimensional CdSxSel-x cyrstallites grown in a glass matrix", Optical Engineering, vol. 34, No. 4, Apr. 30, 1995, pp. 1054-1071.

Kijima, S. et al. "Spectra of magnetic circular dichroism of absorption and luminescence of Eu-doped CaS single crystals", Journal of Luminescence, Elsevier BV North-Hollarnd, NL., vol. 55, No. 4, Jul. 31, 1993, pp. 187-191.

Chen, D. et al. "Novel rare earth ions-doped oxyfluoride nano-composite with efficient upconversion white-light emission", Journal of Solid State Chemisty, Orlando, FL, US, vol. 181, No. 10, Jul. 11, 2008, pp. 2763-2767.

International Search Report on corresponding PCT Application No. PCT/JP2017/014939, dated Jul. 18, 2017.

International Preliminary Report on Patentability on corresponding PCT Application No. PCT/JP2017/014939, dated Oct. 16, 2018.

Office Action (Communication pursuant to Article 94(3) EPC) dated Jul. 15, 2020, by the European Patent Office in corresponding European Patent Application No. 17782422.4. (6 pages).

* cited by examiner

R    60nm

US 10,807,903 B2

NANOCOMPOSITES AND METHOD OF MANUFACTURING NANOCOMPOSITES

CROSS-REFERENCE TO RELATED APPLICATIONS

This application is based upon and claims the benefit of priority from the prior Japanese Patent Application No. 2016-81918, filed on Apr. 15, 2016, Japanese Patent Application. No. 2017-62297, filed on Mar. 28, 2017 and International Patent Application No. PCT/JP2017/014939, filed on Apr. 12, 2017, the entire content of each of which is incorporated herein by reference.

BACKGROUND OF THE INVENTION

1. Field of the Invention

The present invention relates to nanocomposites and, for example, to functional members such as a luminant and a magnetic body.

2. Description of the Related Art

Light emitting modules that allow obtaining a desired emission color by combining a semiconductor light emitting device such as a light emitting diode (LED) and a laser diode (LD) with a phosphor excited by the light emitted by the semiconductor light emitting device and emitting a light subjected to wave length conversion have been devised.

In the case of the phosphor in a powder form, emission color converters or color converter members, in which a desired shape is realized by dispersing the phosphor in a transparent matrix of glass, resin, etc., have been devised.
[patent document 1] JP2001-119075
[patent document 2] JP2008-208380

However, many of the phosphors in a powder form are comprised of polycrystals. Since polycrystals include a collection of very fine crystallites sized about 10-100 nm, the light is scattered heavily in the particles and so it has been difficult for the light to pass through polycrystal particles.

SUMMARY OF THE INVENTION

The present invention addresses the above-described issue, and an illustrative purpose thereof is to provide a luminant in which scattering of incident light is inhibited. Another illustrative purpose is to provide a nanocomposite in which the function and durability are considered.

A nanocomposite according to an embodiment of the present includes: a matrix phase; and a functional area disposed in the matrix phase. The functional area contains monocrystal fine particles.

Another embodiment of the present invention relates to a method of manufacturing a nanocomposite. The method includes: placing one or more compounds as base materials for a phosphor on a surface of a member used as a matrix phase; and heating a composite while the compounds are placed on the surface of the member.

BRIEF DESCRIPTION OF THE DRAWINGS

Embodiments will now be described, by way of example only, with reference to the accompanying drawings that are meant to be exemplary, not limiting, and wherein like elements are numbered alike in several figures, in which.

DETAILED DESCRIPTION OF THE INVENTION

Figure 1A:
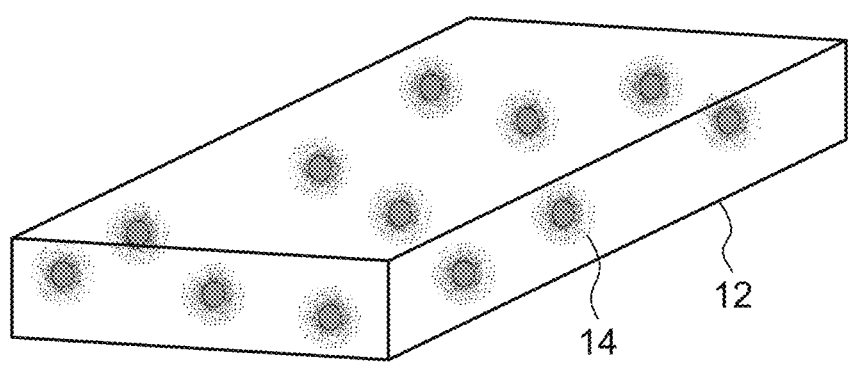
FIG. 1A is a schematic diagram of a plate-shaped luminant.

A nanocomposite according to an embodiment of the present includes: a matrix phase; and a functional area disposed in the matrix phase. The functional area contains monocrystal fine particles. According to this embodiment, the functional area containing monocrystal fine particles is dispersed in the matrix phase so that the impact from the environment is reduced.

The functional area may be localized in a crystal area in which a portion of the matrix phase is crystallized. In this way, the functional area can be formed inside the matrix phase relatively easily.

The matrix phase may be made of silica, and the crystal area may have a cristobalite structure in which a portion of the silica is crystallized. In this way, silica, which is relatively stable, can be used as a base material.

The monocrystal fine particles may be particles of a deliquescent compound. In the related art, monocrystal fine particles of a deliquescent compound have an extremely short life during which they exhibit a function. According to the present invention, however, a variety of compounds having a low resistance to humidity that could not have have been used in the related art can be used so long as they meet the initial performance required of the functional area.

The compound may be a phosphor represented by $M^{II}X_2$:Re ($M^{II}$ is one or more element selected from the group consisting of Mg, Ca, Sr, Ba, Cd, Zn, and Mn, X is one or more elements selected from the group consisting of F, Cl, and I, and Re is one or more elements selected from the group consisting of the rare-earth elements).

The compound may be a phosphor represented by $M^{III}E$ ($M^{III}$ is one or more elements selected from the group consisting of Zn and Cd, and E is one or more elements selected from the group consisting of S, Se, and Te).

The compound may be a phosphor represented by $M^{II}S$:Re ($M^{II}$ is one or more elements selected from the group consisting of Mg, Ca, Sr, Ba, Cd, Zn, and Mn, and Re is one or more elements selected from the group consisting of the rare-earth elements). The compound may be a phosphor represented by $M^{I}S:M^{2+}$ or $M^{II}s:M^{2+}$ ($M^{I}$ is Ag or Cu, $M^{II}$ is one or more elements selected from the group consisting of Sn, Zn, and Cd, and $M^{2+}$ is one or more elements selected from the group consisting of Fe, Co, and Mn).

The fine particles may have an average particle diameter of 1~100 nm. In this way, the desired function can be implemented by a smaller amount of fine particles than in the related art.

Another embodiment of the present invention relates to a method of manufacturing a nanocomposite. The method includes: placing one or more compounds as base materials for a phosphor on a surface of a member used as a matrix phase; and heating a composite while the compounds are placed on the surface of the member. This embodiment allows the compound embodying the phosphor to enter the matrix phase by a simple method. It also allows the compound embodying a magnetic body to enter the matrix phase.

An arithmetic mean roughness Ra of the surface of the member may be 5~20 μm. This makes it easy for the phosphor to enter the matrix phase.

Optional combinations of the aforementioned constituting elements, and implementations of the invention in the form of methods, apparatuses, and systems may also be practiced as additional modes of the present invention.

According to the present invention, it is possible to provide a nanocomposite in which the function and durability are considered.

A description will be given of an embodiment of the present invention with reference to the drawings. In the explanations of the figures, the same elements shall be denoted by the same reference numerals, and duplicative explanations be omitted appropriately.

(Luminant)

Figure 1B:
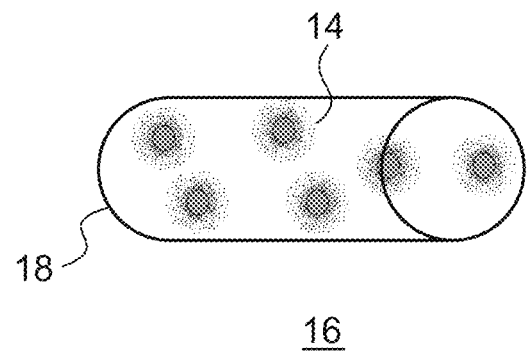
FIG. 1B is a schematic diagram of a fiber-shaped luminant.
Figure 1C:
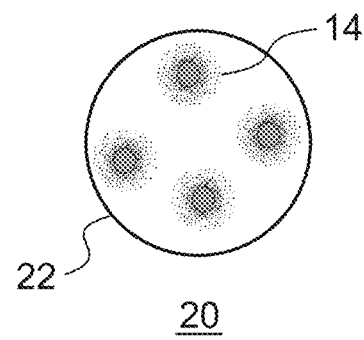
FIG. 1C is schematic diagram of a luminant in a particle form.

A description first be given of a schematic structure a luminant of nancomposite type according to an embodiment. FIG. 1A is a schematic diagram of a plate-shaped luminant, FIG. 1B is a schematic diagram of a fiber-shaped luminant, and FIG. 1C is schematic diagram of a luminant in a particle form.

The luminant 10 shown in FIG. 1A includes a plate-shaped matrix phase 12 and fluorescent areas 14 dispersed in the matrix phase 12. Each fluorescent area 14 includes a phosphor comprised of monocrystal fine particles. The phosphor 16 shown in FIG. 1B includes a fiber-shaped matrix phase 18 and fluorescent areas 14 dispersed in the matrix phase 18. The phosphor 20 shown in FIG. 1C includes a matrix phase 22 in a particle form and fluorescent areas 14 dispersed in the matrix phase 22.

In the phosphors described above, fluorescent areas each containing a phosphor comprised of monocrystal fine particles are dispersed in a matrix phase. Therefore, scattering of light in the fluorescent area is inhibited as compared with a case where polycrystal phosphors are dispersed.

A detailed description will now be given of steps of forming a phosphor of nanocomposite type comprised of monocrystal fine particles. A description will be given of a case where the matrix phase comprises silica. FIGS. 2A-2D are schematic diagrams illustrating a mechanism of formation of a phosphor of nanocomposite type.

Figure 2A:
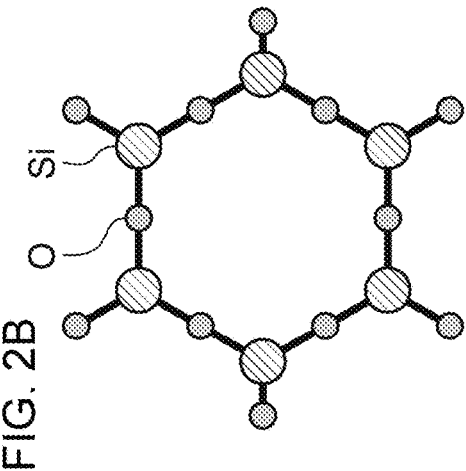
FIGS. 2A-2D are schematic diagrams illustrating a mechanism of formation of a phosphor of nanocomposite type.
Figure 2B:
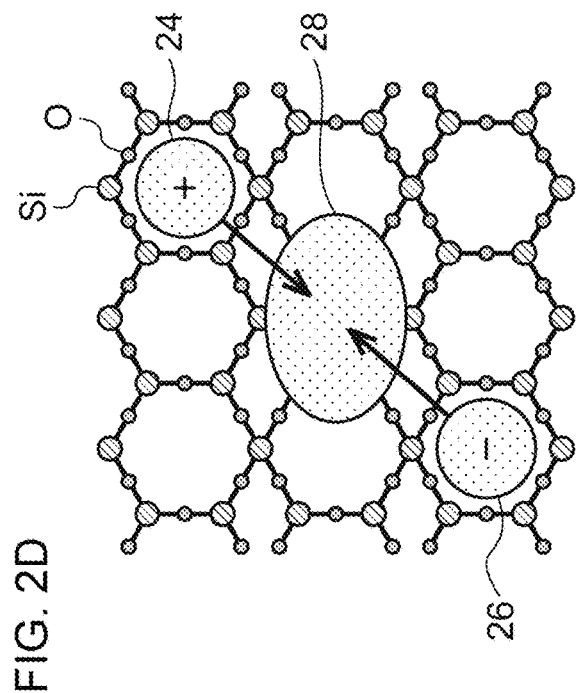
Figure 2C:
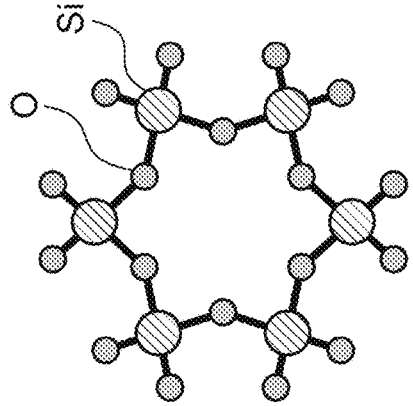

Silica has an amorphous structure having a basic skeleton in which $SiO_4$ tetrahedrons are joined by Si—O—Si bonds. The coupling angle of Si—O—Si is 145°±10° (FIG. 2A). Silica exhibits a small coefficient of thermal expansion when heated to about 1000° C., but the coefficient of thermal expansion increases gradually beyond about 1000° C. This is because active hydrogen is produced from OH groups on the silica surface and severance and rearrangement of Si—O—Si bonds occur in selected portions of the silica. In this process, the coupling angle of Si—O—Si grows to 180° and a large gap is created in a network of $SiO_4$ joined together. The gap defines a pocket for positive ions 24 such as $Ca^{2+}$ and $Eu^{2+}$, and negative ions 26 such as halogen, causing these ions to be incorporated into a network of $SiO_4$ joined together.

Figure 2D:
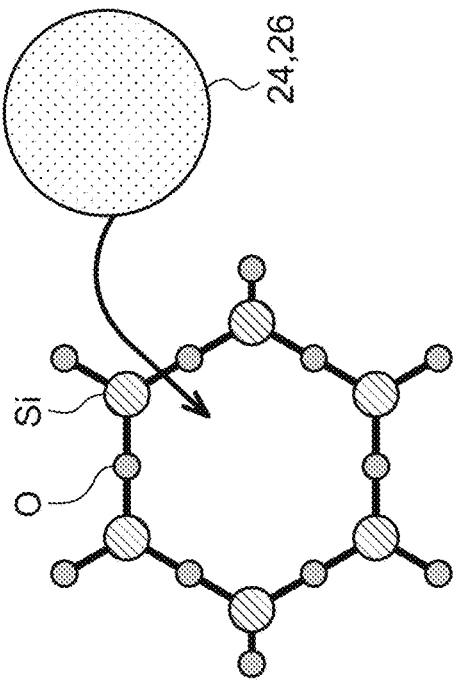

Thermal diffusion causes positive ions 24 and negative ions 26 thus incorporated to be bonded, creating ion crystal cores 28 (FIG. 2D). Production of ion crystal cores 28 is considered to set off crystallization of the silica in the matrix phase to produce cristobalites. It is inferred that the phosphor of nanocomposite type is produced in this way.

Thus, the phosphor area according to the embodiment has a cristobalite structure produced by crystallization of portions of the silica embodying the matrix phase at least at the interface with the matrix phase. Accordingly, the phosphor contained in the fluorescent areas is stabilized. This also demonstrates that slica, which is relatively stable, can be used as a base material of the matrix phase.

A more specific description will be given with reference to the examples.

Example 1

A luminant 1 according to Example 1 is embodied by a quartz glass plate that contains $CaI_2:Eu^{2+}$ as a fluorescent component. To manufacture the luminant 1, quartz glass sized 30 mm×30 mm and having a thickness of 1 mm is first prepared as a matrix phase, and the surface is roughened by a sand blast process (arithmetic mean roughness Ra=10 μm). The roughness may be appropriately selected within a range 5~20 μm. This makes it easy for the phosphor to enter the matrix phase. The glass surface was then cleaned with pure water to produce a matrix phase of a substrate shape.

The fluorescent component is then prepared. To manufacture the fluorescent component, base materials including $CaI_2$, $EuCl_3$, $NH_4I$, and $NH_4F$ are mixed in a globe box of an $N_2$ atmosphere (molar ratio of 1:0.08:0.3:0.05) to produce a base mixture. The roughened surface of quartz glass described above is paved by 0.5 g of this base mixed powder. The composite is put into an alumina calcination container and heated at 1000° C. for 12 hours in a hydrogen-containing nitrogen atmosphere ($N_2/H_2$=95/5). The substrate was then cleaned with hot pure water to wash away excess base materials and obtain a fluorescent plate (plate-shaped luminant 1).

Figure 3:
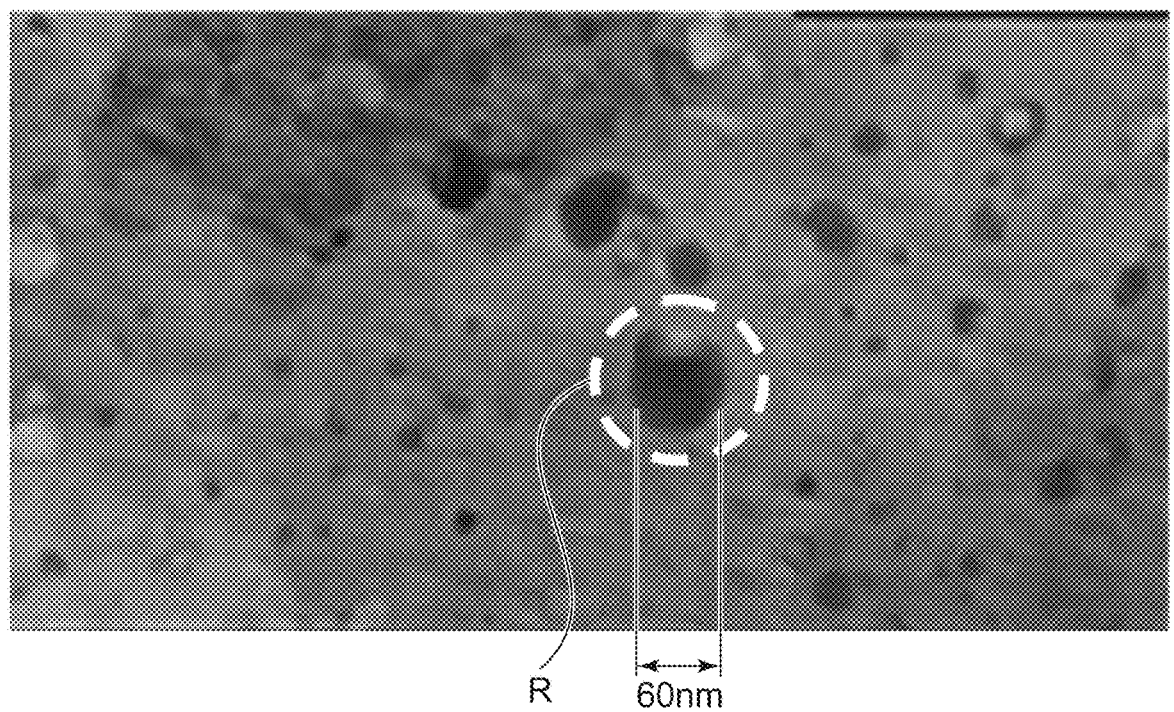
FIG. 3 is a transmission electron microscope (TEM) image of the fluorescent plate according to Example 1.
Figure 4:
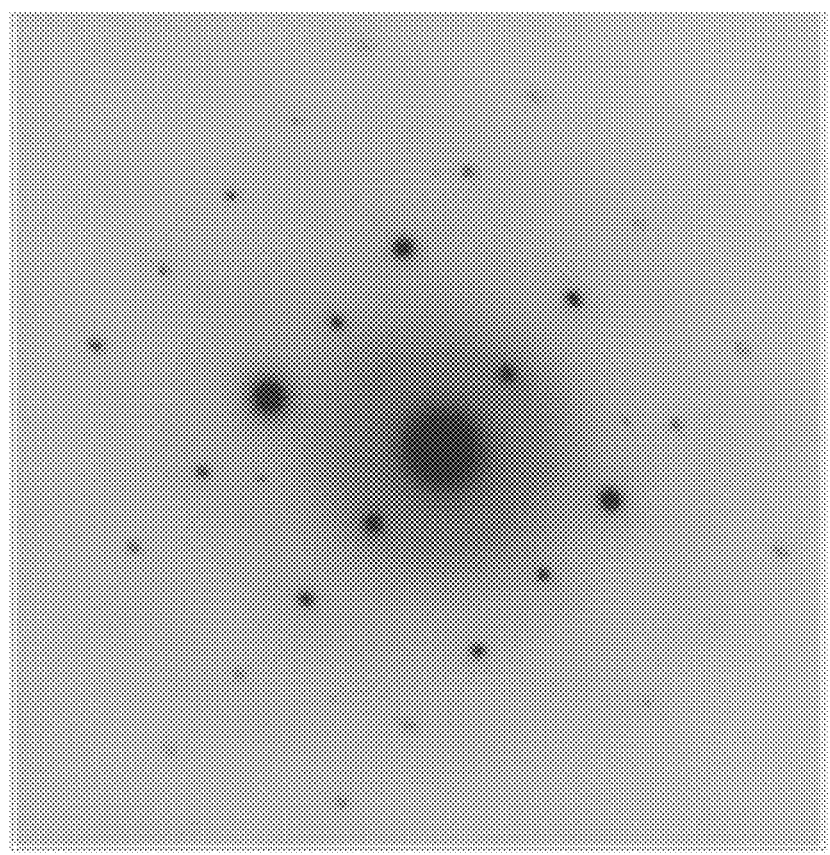
FIG. 4 shows an electron beam diffraction pattern in an area R of FIG. 3.

FIG. 3 is a transmission electron microscope (TEM) image of the fluorescent plate according to Example 1. FIG. 4 shows an electron beam diffraction pattern in an area R of FIG. 3. The results shown in FIGS. 3 and 4 and other analysis revealed that portions of the quartz glass are crystallized and cristobalites are produced in the fluorescent plate according to Example 1. It was also revealed that the $CaI_2$:Eu monocrystal fluorescent component of φ60 nm is dispersed in the fluorescent plate. That the fluorescent component is comprised of monocrystals is clear from the electron beam diffraction pattern shown in FIG. 4. It was also revealed that the depth to which the $CaI_2$:Eu monocrystals are dispersed is about 250 μm and the monocrystal fine particles are dispersed such that the particles are completely covered by the matrix phase.

Figure 5:
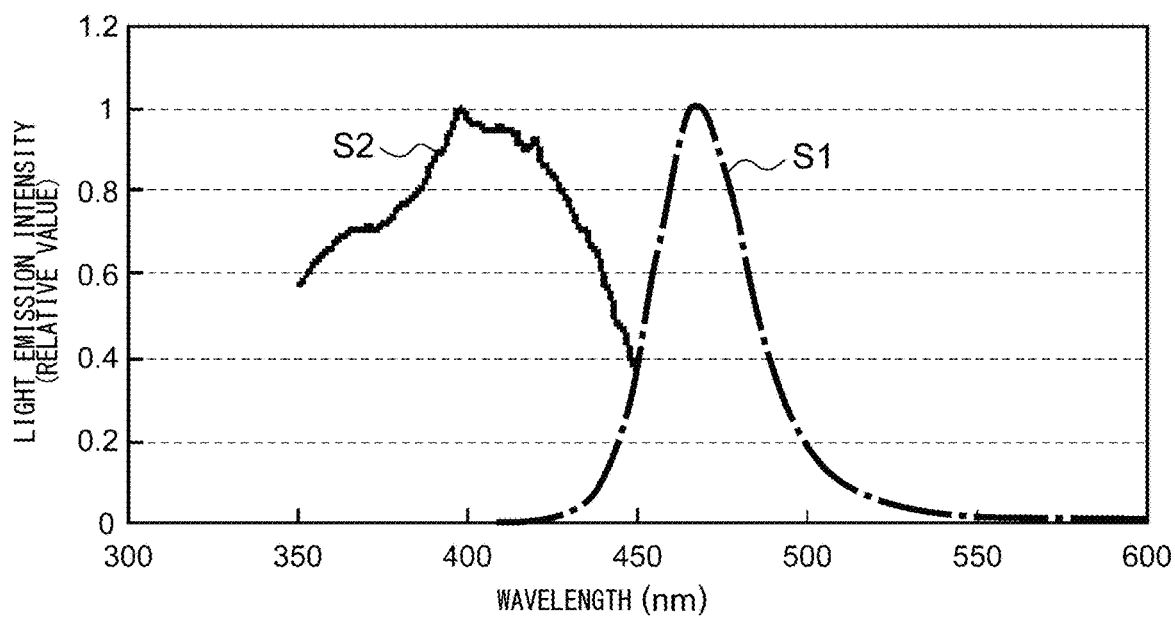
FIG. 5 shows an excitation spectrum and an emission spectrum of the fluorescent plate according to Example 1.

FIG. 5 shows an excitation spectrum and an emission spectrum of the fluorescent plate according to Example 1. As can be seen in the excitation spectrum S1 shown in FIG. 5, the fluorescent plate according to Example 1 absorbs a near ultraviolet light of a wavelength around 400 nm. The fluorescent plate according to Example 1 emits a blue light having a peak wavelength around 465 nm by being excited by a near ultraviolet light having a peak wavelength of 400 nm.

Example 2

The luminant 2 according to Example 2 is embodied by alkaline-earth borosilicate glass that contains CdSe as a fluorescent component. To manufacture the luminant 2, the mixed powder of $SiO_2$ (60 mol %)-SrO (20 mol %)-$B_2O_3$ (20 mol %) was first melted at 1560° C. and was caused to flow on a steel plate, and a glass piece sized 10 mm on a side (t=1.5 mm) was cut out. The glass piece thus cut out was immersed in a 2N aqueous solution of KOH for 1 minute and were subject to surface etching. The glass surface was then cleaned with pure water to produce a matrix phase of a substrate shape.

The fluorescent component is then prepared. To manufacture the fluorescent component, base materials including $B_2Se_3$, CdO, and $NH_4F$ are mixed in a globe box of an $N_2$ atmosphere (molar ratio of 1:3:0.1) to produce a base mixture. The etched surface of alkaline-earth borosilicate glass described above is paved by 0.5 g of this base mixed powder. A sapphire substrate is placed on the paved surface. The composite is heated at 550° for 10 minutes, and then the temperature is rapidly increased to 1000° C. The composite is maintained for 5 hours in a hydrogen-containing nitrogen atmosphere ($N_2/H_2$=95/5). The substrate was then cleaned with hot pure water to wash away excess base materials and obtain a fluorescent plate (plate-shaped luminant 2).

Figure 6:
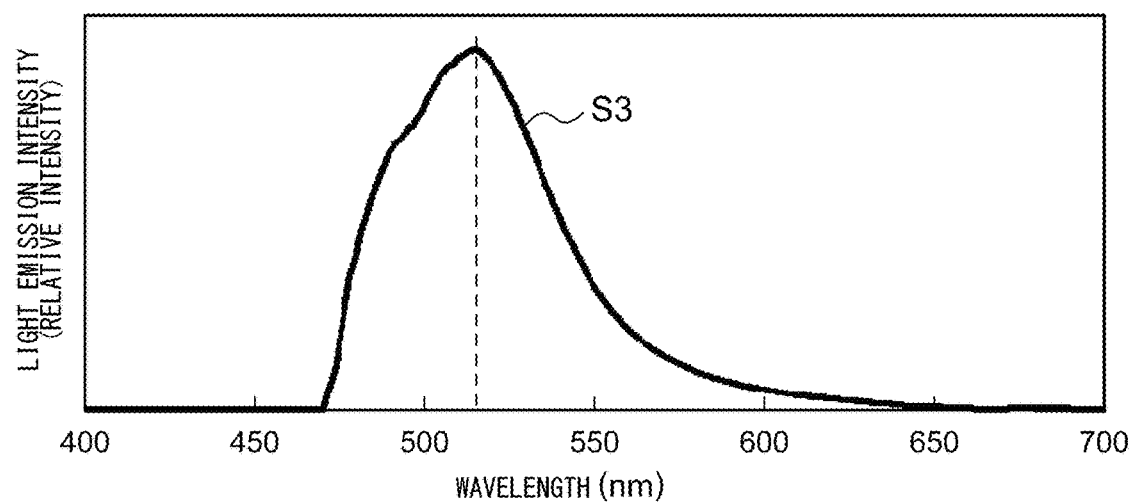
FIG. 6 shows an emission spectrum of the fluorescent plate according to Example 2.

The fluorescent plate according to Example 2 was revealed to be a luminant in which CdSe quantum dots of φ3~8 nm are dispersed inside a glass matrix phase. FIG. 6 shows an emission spectrum of the fluorescent plate according to Example 2. The fluorescent plate according to Example 2 is excited by a near ultraviolet light having a peak wavelength of 400 nm or smaller, and, as can be seen in the emission spectrum S3 shown in FIG. 6, emits an orange light having a peak wavelength around 520 nm.

Example 3

A luminant 3 according to Example 3 is embodied by a quartz fiber that contains $CaCl_2:Eu^{2+}$ as a fluorescent component. To manufacture the luminant 3, fiber-shaped quartz glass of φ200 μm and a length of 20 mm is first immersed in a 2N aqueous solution of NaOH and is subject to an ultrasonic treatment for 1 minute. The glass was then filtered and cleaned by pure water and was dried to produce a fiber-shaped matrix phase.

The fluorescent component is then prepared. To manufacture the fluorescent component, base materials including $CaCl_2$, $EuCl_3$, and $NH_4Cl$ are mixed in a globe box of an $N_2$ atmosphere (molar ratio of 1:0.10:0.4) to produce a base mixture. 1.0 g of this base mixed powder and 1 g of the quartz fiber described above are placed in a polypropylene pot and mixed by a rotary blender for 10 minutes. The fiber is then put into an alumina calcination container and heated at 1000° C. for 5 hours in a hydrogen-containing nitrogen atmosphere ($N_2/H_2$=95/5). After calcination, the fiber was cleaned with hot pure water to wash away excess base materials and obtain a fluorescent fiber (fiber-shaped luminant 3).

It was revealed that portions of the quartz glass are crystallized and cristobalites are produced in the fluorescent fiber according to Example 3. It was also revealed that the $CaCl_2$:Eu monocrystal fluorescent component of φ60 nm is dispersed in the fluorescent fiber.

Figure 7:
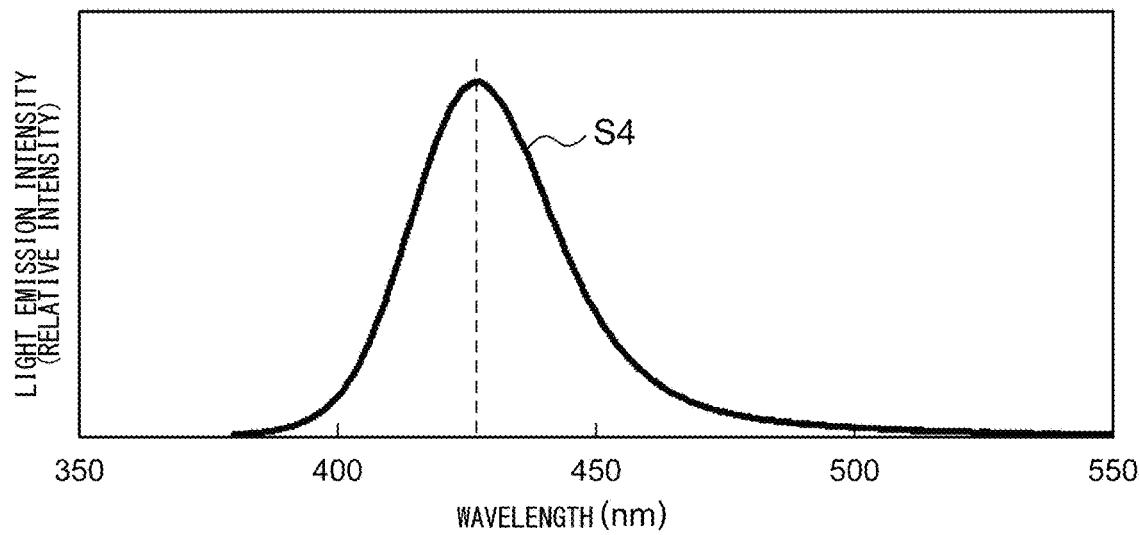
FIG. 7 shows an emission spectrum of the fluorescent fiber according to Example 3.

FIG. 7 shows an emission spectrum of the fluorescent fiber according to Example 3. The fluorescent fiber according to Example 3 is excited by a near ultraviolet light having a peak wavelength of 380 nm or smaller, and, as can be seen in the emission spectrum S4 shown in FIG. 7, emits a blue light having a peak wavelength around 425 nm.

Example 4

A luminant 4 according to Example 4 is embodied by glass fluoride that contains $YF_2:Eu^{3+}$ as a fluorescent component. To manufacture the luminant 4, the mixed powder of $SiO_2$ (50 mol %)-$PbF_2$ (49 mol %)-$YF_3$ (0.5 mol %)-$EuF_3$ (0.5 mol %) was first melted at 1000° C. and was caused to flow on a steel plate, and a glass plate sized 10 mm on a side (t=1.5 mm) was cut out. The glass plate thus cut out was annealed at 400° C. for 5 hours to crystallize nano-fluorescent component inside the matrix phase.

Figure 8:
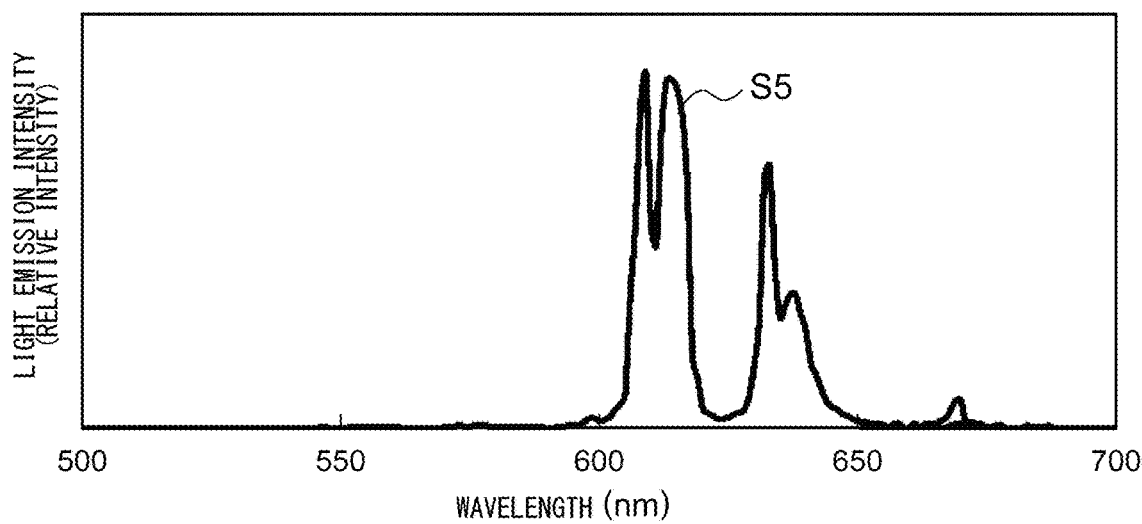
FIG. 8 shows an emission spectrum of the fluorescent plate according to Example 4.

The fluorescent plate according to Example 4 is a luminant in which the $YF_3:Eu^{3+}$ monocrystal fluorescent component of about φ20 nm is dispersed inside the glass matrix phase. FIG. 8 shows an emission spectrum of the fluorescent plate according to Example 4. The fluorescent plate according to Example 4 is excited by an ultraviolet light having a peak wavelength of 254 nm, and, as can be seen the emission spectrum S5 shown in FIG. 8, emits a red light having a peak wavelength around 609 nm.

Example 5

The luminant 5 according to Example 5 is embodied by phosphate glass that contains (Y, Ce, Tb) $PO_4$ as a fluorescent component. To manufacture the luminant 5, the mixed powder of $SiO_2$ (50 mol %)-$P_2O_5$ (15 mol %)-$Y_2O_3$ (9 mol %)-$CeO_4$ (0.3 mol %)-$TbF_2$ (0.7 mol %) was first melted at 950° C. and was caused to flow on a steel plate, and a glass plate sized 10 mm on a side (t=1.5 mm) was cut out. The glass plate thus cut out was annealed at 400° C. for 5 hours to crystallize nano-fluorescent component in the matrix phase.

Figure 9:
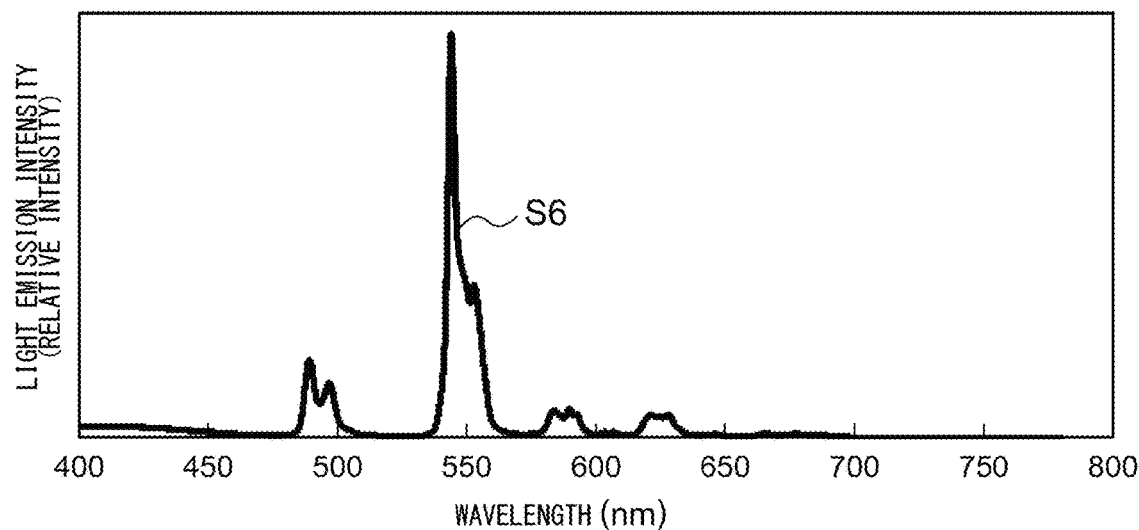
FIG. 9 shows an emission spectrum of the fluorescent plate according to Example 5.

The fluorescent plate according to Example 5 is a luminant in which the (Y, Ce, Tb) $PO_4$ monocrystal fluorescent component of about φ30 nm is dispersed inside a glass matrix phase. FIG. 9 shows an emission spectrum of the fluorescent plate according to Example 5. The fluorescent plate according to Example 5 is excited by a near ultraviolet light having a peak wavelength of 350 nm or smaller, and, as can be seen in the emission spectrum S6 shown in FIG. 9, emits a green light having a peak wavelength around 543 nm.

Example 6

A luminant 6 according to Example 6 is embodied by silica glass that contains $CaS:Eu^{2+}$ as a fluorescent component. To manufacture the luminant 6, 5 g of amorphous $SiO_2$ powder of φ30 μm and 20 g of $ZrO_2$ balls of φ3 mm were weighted, put into a $ZrO_2$ pot, and ground for 10 minutes by using a planetary mill at a rotation speed of 300 rpm.

The fluorescent component is then prepared. To manufacture the fluorescent component, base materials including CaS:Eu $(NO_3)_3:NH_4F$ are mixed in a globe box of an $N_2$ atmosphere (molar ratio of 10:0.5:0.1) to produce a base mixture. 0.5 g of this base mixed powder is mixed with 4.5 g of silica glass processed as described above in a globe box of a nitrogen atmosphere. The mixed powder is then put into an alumina crucible, and the temperature is increased to 1400° C. The mixed powder is maintained for 5 hours in a hydrogen-containing nitrogen atmosphere ($N_2/H_2$=95/5). The resultant powder was then cleaned with dilute hydrochloric acid to wash away excess base materials and obtain a fluorescent plate (plate-shaped luminant 6).

Figure 10:
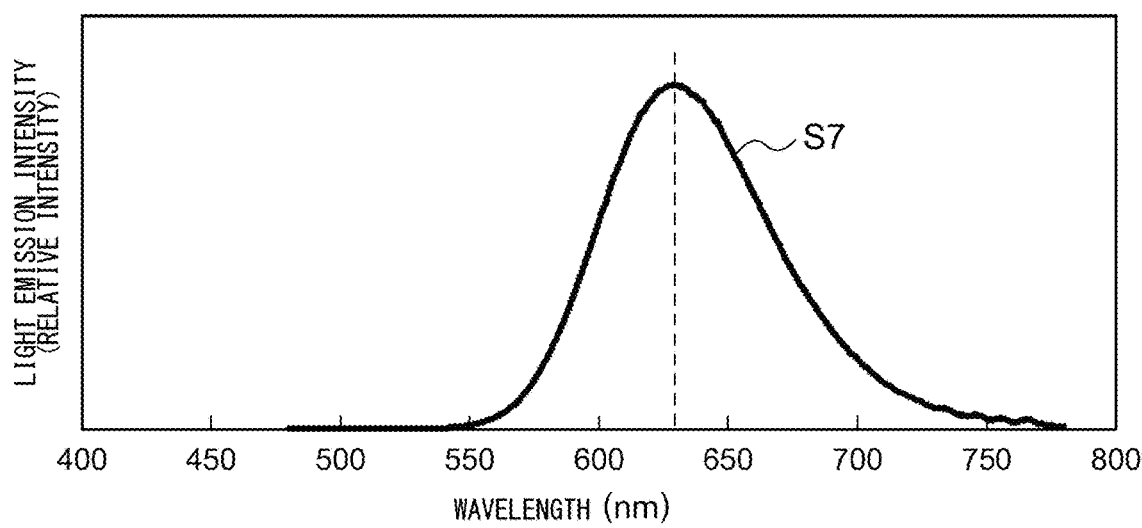
FIG. 10 shows an emission spectrum of the fluorescent plate according to Example 6.

The fluorescent plate according to Example 6 is a luminant in which $CaS:Eu^{2+}$ of φ50 mm is dispersed inside a silica matrix phase. FIG. 10 shows an emission spectrum of the fluorescent plate according to Example 6. The fluorescent plate according to Example 6 is excited by a blue light having a peak wavelength of 450 nm, and, as can be seen in the emission spectrum S7 shown in FIG. 10, emits a red light having a peak wavelength around 625 nm.

Example 7

A luminant 7 according to Example 7 is embodied by silica particles that contain $CaI_2:Eu^{2+}$ as a fluorescent component. To manufacture the luminant 7, amorphous silica ($SiO_2$) particles of φ50 μm is first prepared.

The fluorescent component is then prepared. To manufacture the fluorescent component, base materials including $CaI_2$, $EuCl_3$, $NH_4I$, and $SiO_2$ are mixed in a globe box of an $N_2$ atmosphere (molar ratio of 1:0.08:0.3:8) to produce a base mixture. The base mixed powder is then put into an alumina calcination container and heated at 1000° C. for 12 hours in a hydrogen-containing nitrogen atmosphere ($N_2/H_2$=95/5). The particles were then cleaned with hot pure water to wash away excess base materials and obtain fluorescent particles (the luminant 7 in a particle form).

It was found that the silica is crystallized and the cristobalite represents the main component in the fluorescent particles according to Example 7. It was also revealed that the $CaI_2:Eu$ monocrystal fluorescent component of φ50 nm is dispersed in the fluorescent particles. The fluorescent particles according to Example 7 emit a blue light having a peak wavelength around 465 nm by being excited by a near ultraviolet light having a peak wavelength of 400 nm.

As will be clear from Examples 1 through 7, the fine particles may have an average particle diameter of about 1~100 nm, and, more preferably, about 2~80 nm, and, still more preferably, about 3~60 nm. In this way, desired light emission characteristics can be realized by a phosphor comprised of a smaller number of fine particles.

Further, as described above, the manufacturing method according to the embodiment includes a step of placing one or more compounds as base materials for the phosphor on the surface of a member embodying a matrix phase, and a step of heating the composite while the compounds are placed on the surface of the member. This can allow the compound embodying the phosphor to enter the matrix phase by a simple method.

A description will now be given of the benefit of nanocomposite production.

[Benefit of Humidity Resistance]

Various related-art phosphors with excellent light emission performance have been available in the related art but have posed a serious problem the development of phosphors in that they generally have poor humidity resistance (is deliquescent) and so are impractical. Nanocomposite production according to the invention solves the problem and is particularly useful for fluorescent components (Examples 1, 2, 3, 6, 7) that are excellent in fluorescence characteristics but poor in humidity resistance. Table 1 shows a result of a shelf test in which the phosphors are left for 24 hours at 85° C. and 85%. In Table 1, it is defined the initial fluorescence intensity of each phosphor excited by an excitation wavelength of 365 nm to emit light is 100%. The sustention ratio listed in the table represents the percentage of fluorescence intensity of the phosphor excited by the same wavelength after the shelf test. The phosphors (luminants) according to Examples 1, 2, 3, 6, and 7 exhibited the sustention ratio of 98% or higher and showed no degradation.

TABLE 1

|  | Fluorescent component | Sustention ratio | Sustention rate of phosphor of same composition |
|---|---|---|---|
| Example 1 | $CaI_2:Eu^{2+}$ | 99% | 0% |
| Example 2 | CdSe | 100% | 3% |
| Example 3 | $CaCl_2:Eu^{2+}$ | 98% | 0% |
| Example 6 | $CaS:Eu^{2+}$ | 100% | 8% |
| Example 7 | $CaI_2:Eu^{2+}$ | 99% | 0% |

Thus, the luminants according to the embodiment can be manufactured by using a variety of compounds of low humidity resistance that could not have been used in the related art, so long as they meet the initial performance required of the phosphor. Compounds that can be used in the phosphors according to the embodiment are exemplified by (1)~(5) listed below.

(1) A compound represented by a general formula $M^{II}X_2$:Re ($M^{II}$ is one or more elements selected from the group consisting of Mg, Ca, Sr, Ba, Cd, Zn, and Mn, X is one or more elements selected from the group consisting of F, Cl, and I, and Re is one or more elements selected from the group consisting of the rare-earth elements).

(2) A compound represented by a general formula $M'^{II}E$ ($M^{II}$ is one or more elements selected from the group consisting of Zn and Cd, and E is one or more elements selected from the group consisting of S, Se, and Te).

(3) A compound represented by a general formula $M^{II}S$:Re ($M^{II}$ is one or more elements selected from the group consisting of Mg, Ca, Sr, Ba, Cd, Zn, and Mn, and Re is one or more elements selected from the group consisting of the rare-earth elements).

(4) A compound represented by a general formula $M^{III}X_3$:Re ($M^{III}$ is one or more elements selected from the group consisting of Sc, Y, Pb, Cr, La, and Gd, and Re is one or more elements selected from the group consisting of the rare-earth elements).

(5) A compound represented by a general formula $Re'PO_3$ (Re' is two or more rare-earth elements that essentially require Y).

(Flexibility of the Shape)

Nanocomposite production allows the fluorescent component to be dispersed in the substrate of the matrix phase that is worked into a desired size and shape so that the flexibility of the shape is dramatically improved as compared with the related-art powder phosphor.

(Reduction in Rare Earth Elements)

Nanocomposite production significantly reduces the content rare-earth element embodying the light emission center necessary to obtain a desired fluorescence intensity. Table 2 compares the content of rare-earth elements in the luminants according to Examples 4 and 5 containing 4% of the fluorescent component with the content of rare-earth elements in the powder phosphor of the same composition. As shown in Table 2, inclusion of the monocrystal fine particle phosphor in the fluorescent area as in the case of the luminants according to the embodiment significantly reduces the rare-earth elements used.

|  | Content of rare earth (4% of fluorescent Component) | Rare earth element in powder phosphor of same composition |
|---|---|---|
| Example 4 | 0.5 wt % | 3.1 wt % ($YF_3:Eu_{0.03}$) |
| Example 5 | 0.8 wt % | 5.8 wt % ($YPO_4:Ce_{0.02}Tb_{0.03}$) |

[Nanocomposite Material]

We have not only studied the luminants of nanocomposite type described above but also studied the possibility of realizing nanocomposites having a variety of functions.

Normally, halides (compound of a halogen (fluorine (F), chlorine (Cl), bromine (Br), iodine (I), etc.) and an element having a lower electronegativity), chalcogenides (compound of a Group-XVI element (oxygen (O), sulfur (S), selenium (Se), tellurium (Te), polonium (Po), etc.) and an element having a lower electronegativity), etc. bind weakly to cations and exhibit low thermal relaxation rate and so are not affected so much by phonon oscillation.

Further, interaction between rare earths and anions is small in compounds of transition elements (Group-III elements~Group-XII elements) and rare-earth elements, or in compounds produced by doping transition elements with rare earths. For this reason, these compounds can be turned into functional materials having a desired function at a room temperature, such as luminant materials, magnetic materials, thermoelectric materials, electromagnetic materials, and superconductive materials. These functional materials are available in a certain variety, leaving aside the consideration of use conditions and durability. Meanwhile, materials that can be put into actual use are limited, considering the resistance to external factors such as temperature, humidity, and light. For this reason, there is much room for improvement in the function and performance realized by materials that can be selected.

In this background, we have arrived at the possibility of realizing nanocomposites that exhibit a variety of functions attributable to transition elements and rare-earth elements and are durable at the same time, by encapsulating (i) compounds of halogens/chalcogens and transition elements/rare earth elements or (ii) compounds of halogens/chalcogens and representative elements (doped with rare-earth elements) by silica, which has excellent resistance to humidity.

In other words, we have realized that the functional area exhibiting a desired function may not necessarily have resistance to an external environment and that a number of compounds that could not have been employed in respect of durability in the related art can be used in the functional area by ensuring that the functional area is not directly in contact with the environment.

A description will be given of a novel nanocomposite that functions as a phosphor. In the majority of cases, phosphors of halides and chalcogenides exhibit a high light emission efficiency but has not been suitable for practical use due to the lack of chemical durability. We have manufactured a halide-based nanocomposite phosphor having a high light emission efficiency and a practical durability at the same time. More specifically, the nanocomposite according to an embodiment is produced by dispersing luminescent $CaI_2:Eu^{2+}$ single nanocrystals in a semitransparent silica ($SiO_2$) matrix.

The method of manufacturing a nanocomposite according to one embodiment includes forming single nanocrystals in a crystalline silica matrix through a self-organizing process initiated by a simple solid-phase reaction. The nanocomposite phosphor according to an embodiment emits a strong cold blue light only from single nanocrystals and, regardless of the small Eu content, emits light with a high internal quantum efficiency (IQE) of 98%, which is higher than that of the related-art phosphors. The ratio of absorption is about 85%. The nanocomposite phosphor according to an embodiment has sufficiently practical durability because the $CaI_2$:Eu emission site is embedded in the crystalline silica and the emission site is protected from the outside humidity by the crystalline silica.

We have confirmed that the blue light is generated from $CaI_2$:$Eu^{2+}$ single nanocrystals by using cathode luminescence (CL) and a scanning transmission electron microscope (STEM). We estimate that single nanocrystals are formed in the crystalline silica through self-organization.

Figure 11B:
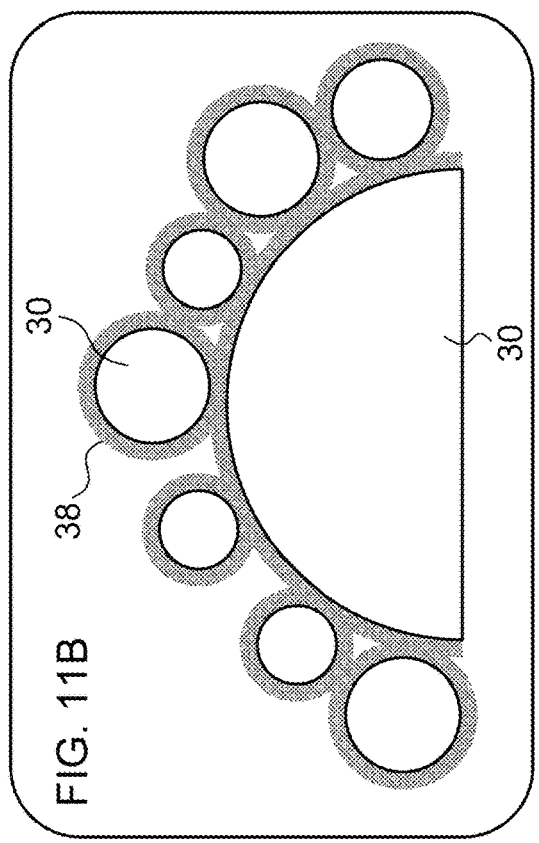
FIGS. 11A-11D are schematic diagrams illustrating an exemplary mechanism of formation of a nanocomposite phosphor.
Figure 11D:
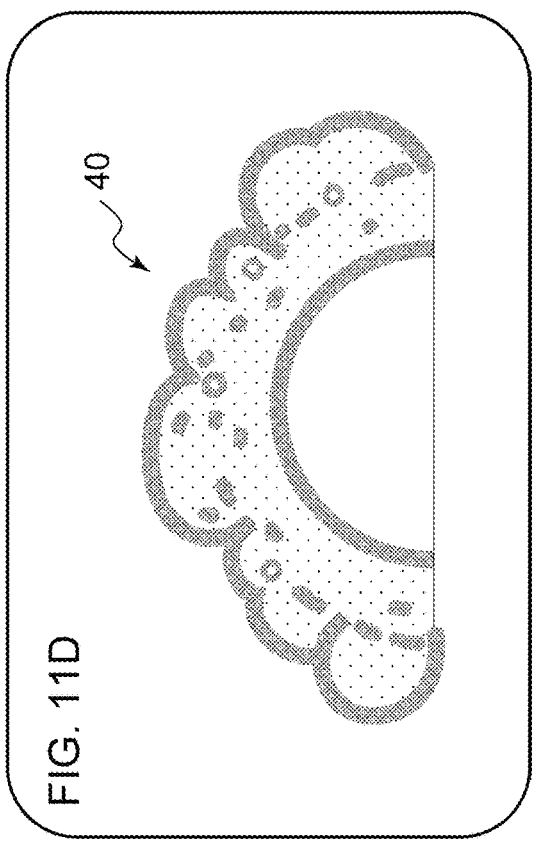
Figure 11A:
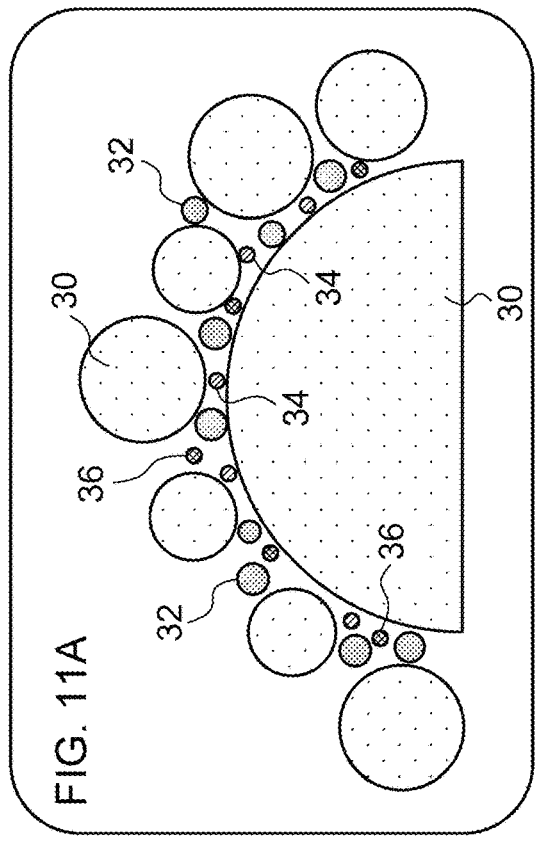

FIGS. 11A-11D are schematic diagrams illustrating an exemplary mechanism of formation of a nanocomposite phosphor. As shown in FIG. 11A, base materials including amorphous $SiO_2$ particles 30, $CaI_2$ particles 32, $EU_2O_3$ particles, and $NH_4I$ particles 36 are mixed. The base mixture is then heated to 1000° C. (1273 K). During the heating, the base mixture undergoes the following two changes.

Figure 12:
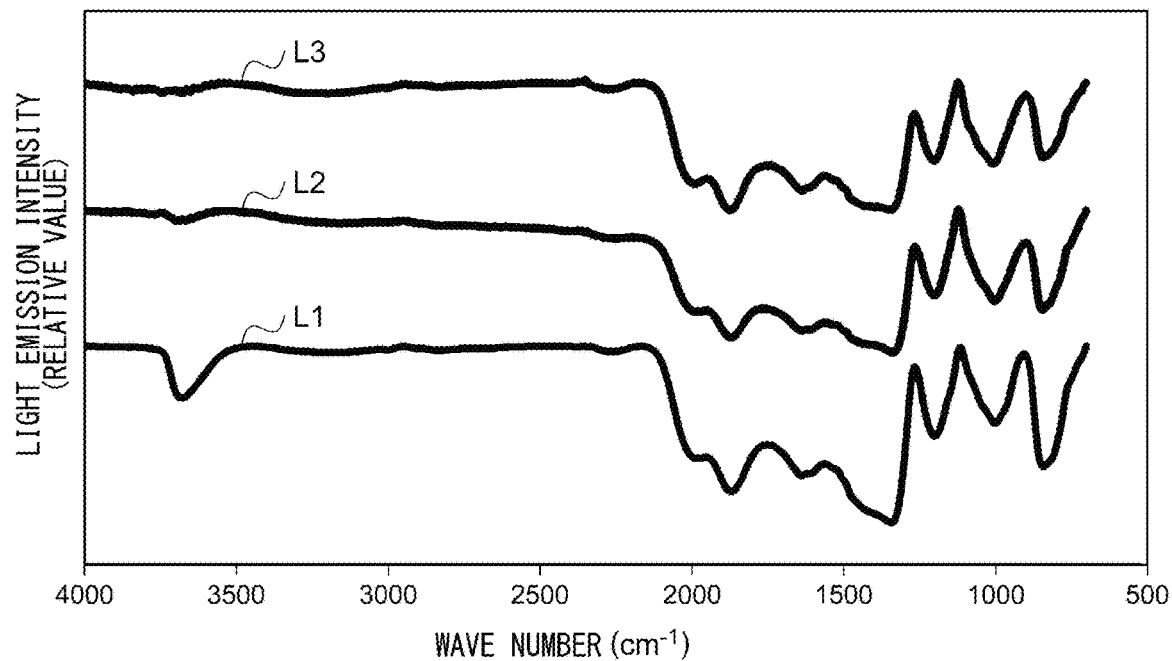
FIG. 12 shows an absorption spectrum of silica before and after the calcination, measured by a Fourier transform infrared spectrophotometer (FTIR)

First, when the temperature exceeds 779° C. (1052 K), the $CaI_2$ particles 32 are melted and form a liquid phase 38 around the $SiO_2$ particles 30 as they melt Eu ions (see FIG. 11B). Then, when the temperature reaches 1000° C., the $SiO_2$ particles 30 are activated due to the loss of OH groups on their surfaces. FIG. 12 shows an absorption spectrum of the silica before and after the calcination, measured by Fourier transform infrared spectrophotometer (FTIR). As show in FIG. 12, the peak (arrow) around 3750 $cm^{-1}$ found before the calcination (line L1) indicating Si—OH bonds disappear after the calcination (line L2 [800° C.] line L3 [1000° C.]), demonstrating that OH groups on the surface of the $SiO_2$ particles 30 are lost.

Figure 11C:
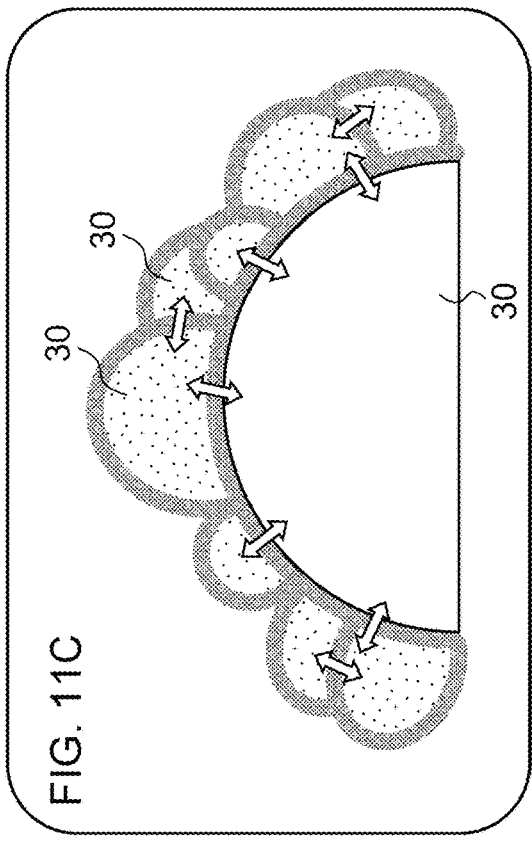
Figure 13:
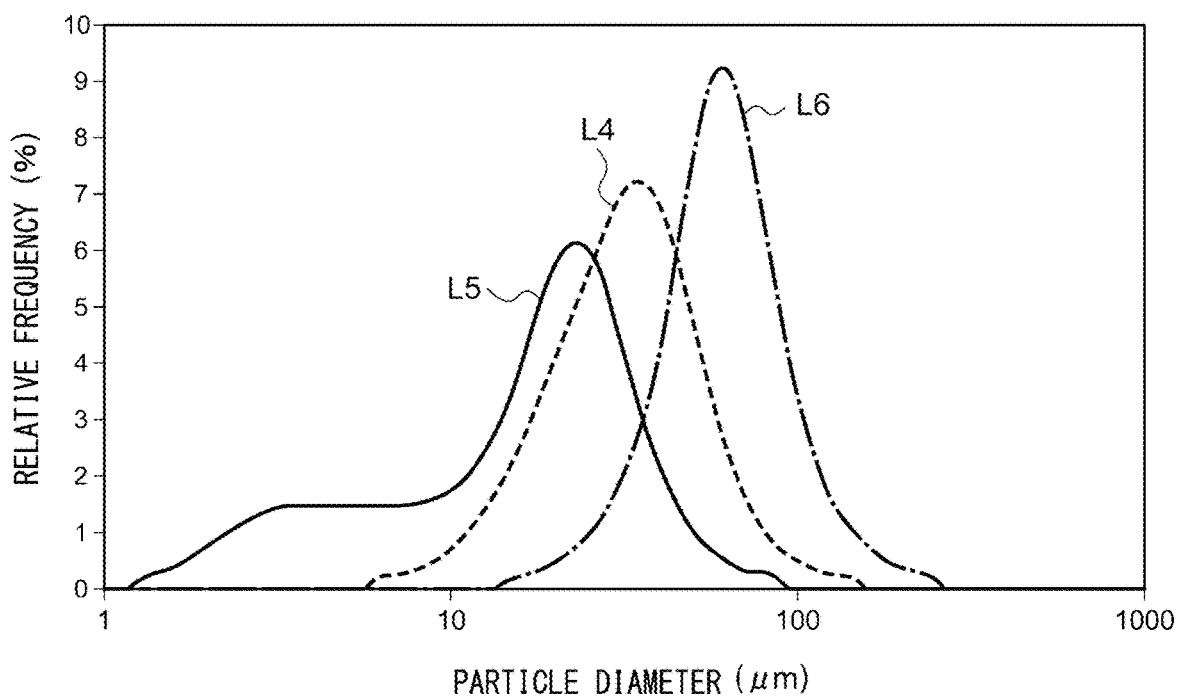
FIG. 13 shows a particle diameter distribution of $SiO_2$ particles occurring before the mixture (line L4), after the mixture (line L5), and after the calcination (line L6)

Thereafter, the melted $CaI_2$ becomes fluid on the surfaces of the activated $SiO_2$ particles 30 (FIG. 11C). The $SiO_2$ particles 30 are crystallized due to the flux effect, beginning at the particle surface. During the crystallization, some $SiO_2$ particles 30 are bonded to form a single $SiO_2$ grain aggregate 40 (FIG. 11D). As a result, the particle diameter of ($CaI_2$/$SiO_2$):$Eu^{2+}$ particles becomes larger than the particle diameter of the $SiO_2$ particles 30 in the starting base materials. FIG. 13 shows a particle diameter distribution of $SiO_2$ particles occurring before the mixture (line L4), after the mixture (line L5), and after the calcination (line L6). As shown in FIG. 13, the average particle diameter of $SiO_2$ particles become smaller when the materials are ground and mixed than before the mixture but, after the calcination, become larger than before the mixture.

Figure 14:
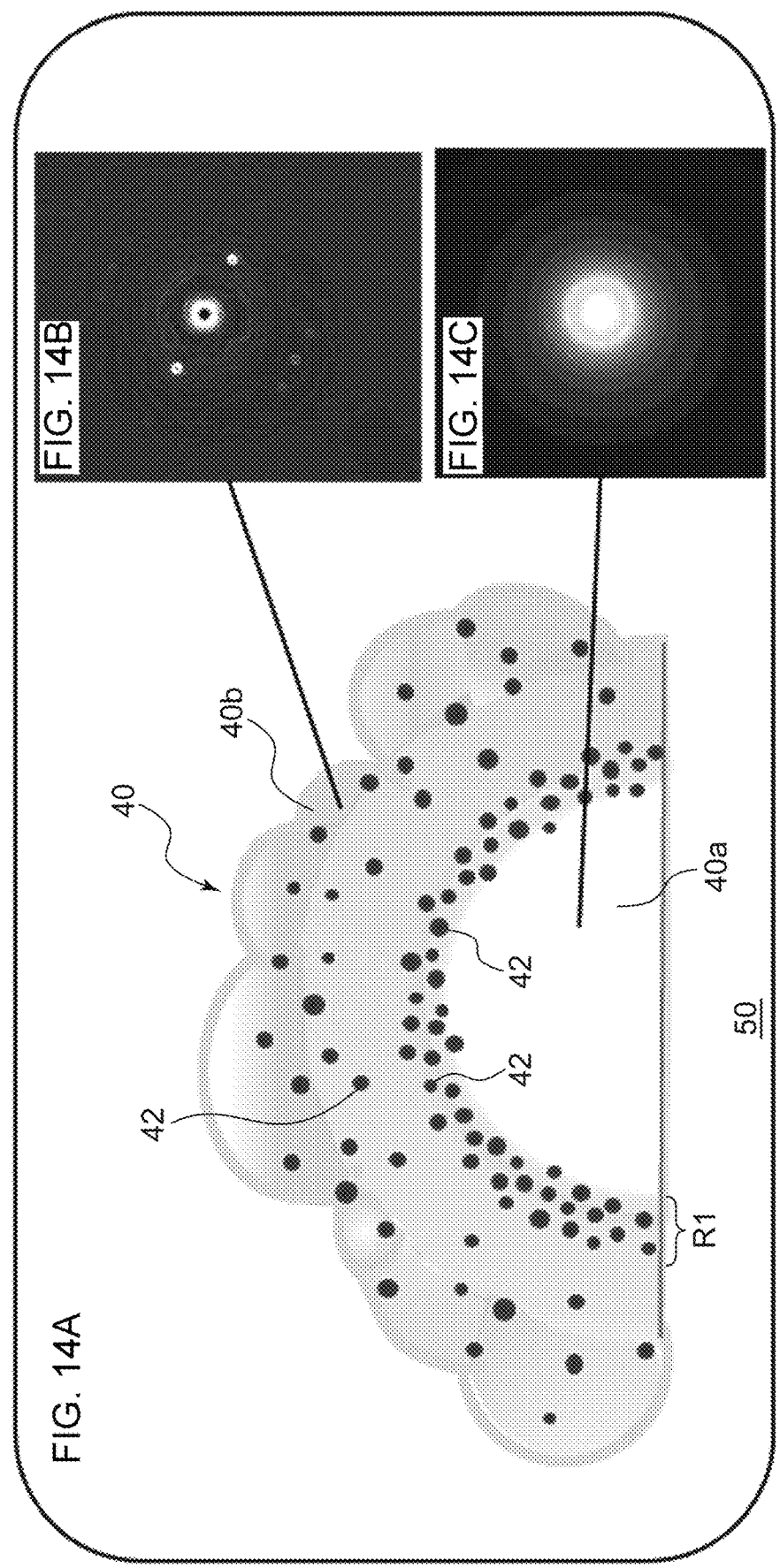
FIG. 14A is a schematic view showing $CaI_2:Eu^{2+}$ single nanocrystals produced inside the calcinated $SiO_2$ grain aggregate.
FIG. 14B shows an electron beam diffraction pattern of the crystal area outward of the grain aggregate.
FIG. 14C shows an electron beam diffraction pattern of the amorphous area toward the center of the grain aggregate.

FIG. 14A is a schematic view showing $CaI_2$:$Eu^{2+}$ single nanocrystals produced inside the calcinated $SiO_2$ grain aggregate, FIG. 14B shows an electron beam diffraction pattern of the crystal area outward of the grain aggregate, and FIG. 14C shows an electron beam diffraction pattern of the amorphous area toward the center of the grain aggregate.

As shown in FIG. 14A, the melted $CaI_2$ is localized between an amorphous area 40a and a crystal area 40b in the bonded $SiO_2$ grain aggregate 40. The melted. $CaI_2$ is solidified in the $SiO_2$ particles in a subsequent temperature lowering step of calcination, thereby producing $CaI_2$:$Eu^{2-}$ single nanocrystals 42. As a result, a nanocomposite phosphor 50 is formed.

The practical durability of the nanocomposite phosphor comprised of ($CaI_2$/$SiO_2$):$Eu^{2+}$ is secured because $CaI_2$: $Eu^{2+}$, which has a poor resistance to humidity, is protected from the ambient air by the crystalline silica. There is found a ring-shaped area R1 in which the single nanocrystals 42 are produced at a high density (FIG. 14A), and an examination is made to see a difference in $SiO_2$ crystal structure inside and outside the ring-shaped area R1.

The electron beam diffraction pattern shown in FIG. 14C reveals that the inside of the ring-shaped area R1, i.e., the homogeneous core, is amorphous. The electron beam diffraction pattern shown in FIG. 14B reveals that the outside of the ring-shaped area R1, i.e., the outer matrix portion is a tetragonal $SiO_2$ crystal layer. In other words, the majority of the single nanocrystals 42 comprised of $CaI_2$:$Eu^{2+}$ is formed at the boundary between the amorphous area 40a of $SiO_2$ particles and the crystal area 40b.

For crystallization of amorphous $SiO_2$ used as the starting base material, the temperature of 1350° C. or higher is necessary. In other words, crystallization of amorphous $SiO_2$ should not occur at the calcination temperature 1000° C. As shown in FIG. 14B, however, $SiO_2$ is crystallized in the outward portion of the $SiO_2$ grain aggregated 40. In other words, this shows that only the area impregnated by $CaI_2$ is crystallized at the calcination temperature 1000° C.

Self-organization of single nanocrystals was also confirmed by another method. (Example 1). In this method, an amorphous $SiO_2$ glass plate having a roughened surface is used as a base material instead of amorphous $SiO_2$ powder. A base material including $CaI_2$ was placed on the roughened surface. The composite was calcinated to produce a nanocomposite fluorescent plate.

The nanocomposite fluorescent plate thus manufactured emits a blue light by being excited by ultraviolet light of 405 nm. It was also confirmed that, by impregnating the silica glass whose surface is roughened with the melted $CaI_2$ flux, the top surface (roughened surface) of the silica glass becomes semitransparent and emits a blue light. Meanwhile, the bottom surface maintains transparency. As described above, it is reasoned that impregnation with the $CaI_2$ flux is linked to the formation of the nanocomposite phosphor.

Thus, according to the manufacturing method of the embodiment, a nanocomposite phosphor comprised of ($CaI_2$/$SiO_2$):$Eu^{2+}$ can be synthesized through a solid-phase reaction at a calcination temperature of 1000° C., which is remarkably lower than the crystallization temperature of $SiO_2$. Further, the nanocomposite phosphor is structured such that $CaI_2$:$Eu^{2+}$ single nanocrystals are embedded in the crystalline silica.

Figure 15:
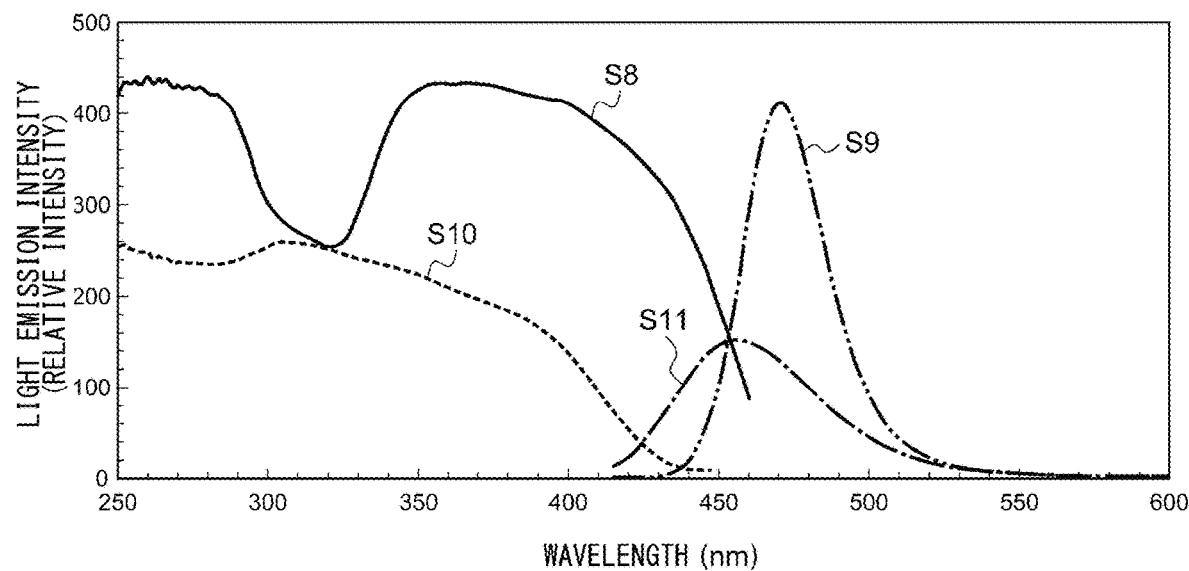
FIG. 15 shows an excitation spectrum and an emission spectrum of the nanocomposite phosphor.

A description will now be given of the characteristics of the nanocomposite phosphor. FIG. 15 shows an excitation spectrum and an emission spectrum of the nanocomposite phosphor. The excitation spectrum S8 and the emission spectrum S9 shown in FIG. 15 are those of the nanocomposite phosphor comprised of ($CaI_2$/$SiO_2$):$Eu^{2+}$. The emission spectrum of the nanocomposite phosphor according an embodiment has a peak wavelength of 471 nm and a half width 32. 4 nm.

Meanwhile, the excitation spectrum S10 and the emission spectrum S11 shown in FIG. 15 are those of a $BaMgAl_{10}O_{17}$:$Eu^{2+}$ (BAM:$Eu^{2+}$) phosphor that is widely used as a blue light phosphor. Despite the fact that the Eu content in the nanocomposite phosphor is ⅙ that of the BAM:$Eu^{2+}$ phosphor, the nanocomposite phosphor excited by 400 nm exhibits a peak light emission intensity about 2.7 times that of the BAM:$Eu^{2+}$ phosphor.

Figure 16:
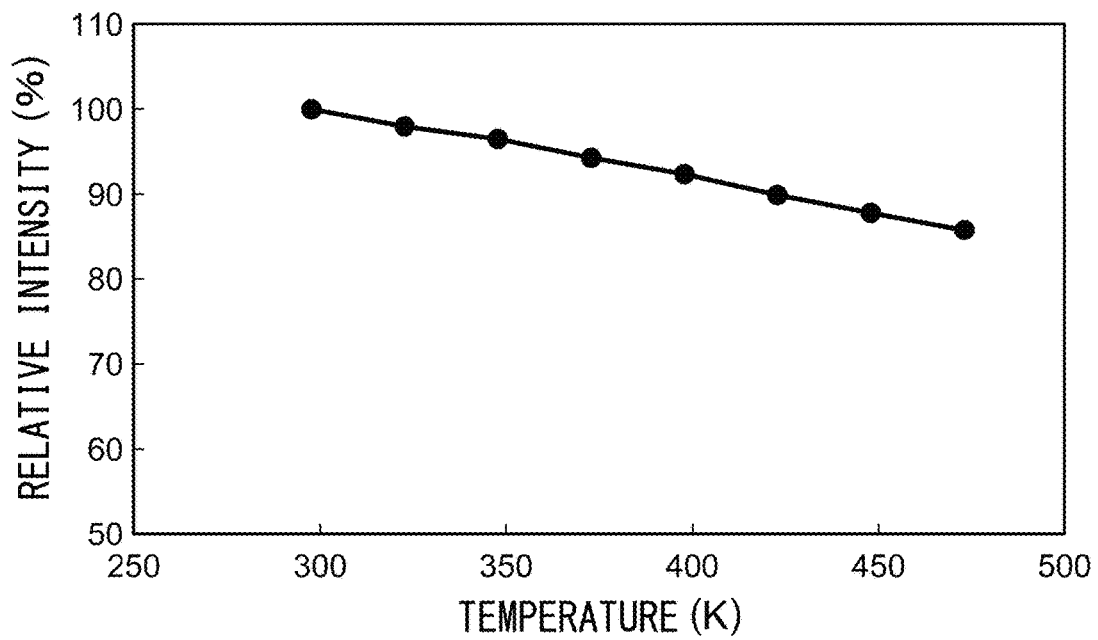
FIG. 16 shows the temperature characteristics of the nanocomposite phosphor.

FIG. 16 shows the temperature characteristics of the nanocomposite phosphor. Referring to FIG. 16, the intensity is normalized by defining the luminescence intensity at a room temperature (30° C.) to be 100%. As shown in FIG. 16, the nanocomposite phosphor maintains 90% or higher luminescence intensity from the room temperature to 150° C.

Figure 17:
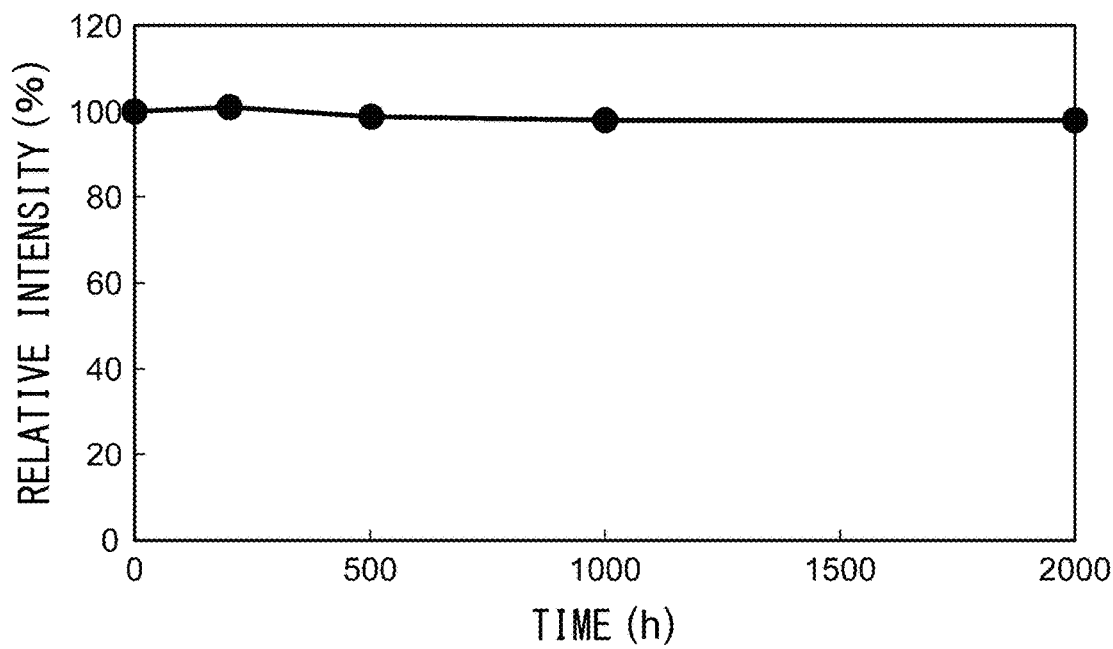
FIG. 17 shows a result of a life test of the nanocomposite phosphor.

FIG. 17 shows a result of a life test of the nanocomposite phosphor. The life test was conducted at a temperature 85° C. and a humidity 85%. The luminescence intensity was measured on an hourly basis as the nanocomposite phosphor was allowed to emit light continuously for 2000 hours. The result shows that variation in the luminescence intensity after 2000 hours is 2% or less, showing that the phosphor exhibits very stable light emission characteristics in a high temperature and high humidity environment.

Thus, although the $(CaI_2/SiO_2):Eu^{2+}$ emission site is formed by an iodide which has a poor resistance to humidity, the light emission performance and the practical level of reliability (durability) can be secured by embedding the emission site in the $SiO_2$ semitransparent matrix. Therefore, nanocomposite production is expected to expand the applications of substances with a low resistance to humidity such as halides and chalcogenides beyond the phosphor.

A description will now be given of an example of manufacturing method in which functional areas are dispersed in a matrix phase of a nanocomposite. One of the features of this manufacturing method is that the melting point of halides and chalcogenides is lower than the crystallization temperature of amorphous silica.

A description will first be given of an overview of the manufacturing method. Calcination is performed at a temperature that melts the functional material comprised of a halide/chalcogenide compound and does not crystallize amorphous silica that embodies the matrix member. In this process, the halide/chalcogenide compound functions as a flux to crystallize the amorphous silica at a temperature lower than the crystallization temperature. In association with the progress of silica crystallization, the halide/chalcogenide compound will be localized near the boundary between the crystalline substance and the amorphous substance. As the calcination proceeds to a cooling step, the halide/chalcogenide compound turned into a liquid phase is cooled and solidified in the silica crystal and is precipitated as 10 nm~100 μm crystals, thereby forming a nanocomposite.

The suitable range of calcination temperature is 1000~1250° C., which is lower than the amorphous silica crystallization temperature of 1300~1350° C. The calcination atmosphere and the deoxidation atmosphere are filled with a gas such as nitrogen, argon, and hydrogen-containing nitrogen. The halide/chalcogenide compound having a melting point of 1200° C. or lower is suitable. Generally, no reactions are induced between a halide/chalcogenide compound and silica. A specific description will be given with reference to examples.

Example 8

The nanocomposite according to Example 8 is embodied by a crystalline silica matrix that contains $CaI_2:Eu^{2+}$ as a fluorescent component. To manufacture the nanocomposite, amorphous silica (average particle diameter 30 μm) having a crystallization temperature 1300° C., $CaI_2$ (melting point 779° C.), and $EuI_3$ were precisely weighted such that molar ratio thereof is 6/0.8/0.1 and were put into an alumina mortar in an Ar gas atmosphere to ground and mix the materials. The mixed powder was then put into an alumina crucible and calcinated at 1000° C. for 10 hours in a hydrogen-containing nitrogen atmosphere (volume ratio $N_2/H_2=95/5$). After calcination, the powder was cleaned with hot pure water to remove excessive iodides and obtain a sample of nanocomposite according to Example 8.

Figure 18:
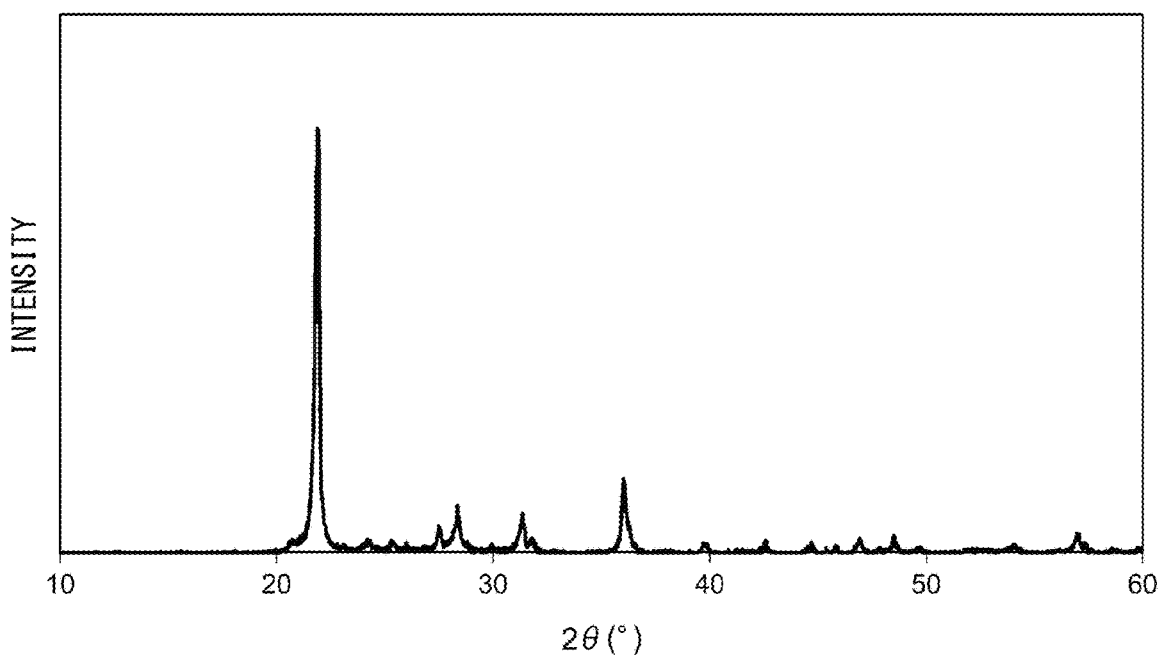
FIG. 18 shows an X-ray diffraction pattern of the nanocomposite according to Example 8.

Powder X-ray diffraction measurement was conducted on the sample thus obtained. FIG. 18 shows an X-ray diffraction pattern of the nanocomposite according to Example 8. An analysis of the peaks shown in FIG. 18 revealed that the nanocomposite according to Example 8 is a powder in which α-cristobalites, which form a high-temperature crystal phase of silica, represent the main phase. Irradiation of the nanocomposite with an ultraviolet light having a peak wavelength of 400 nm resulted in observation of a blue light having a peak wavelength of 461 nm.

Figure 19:
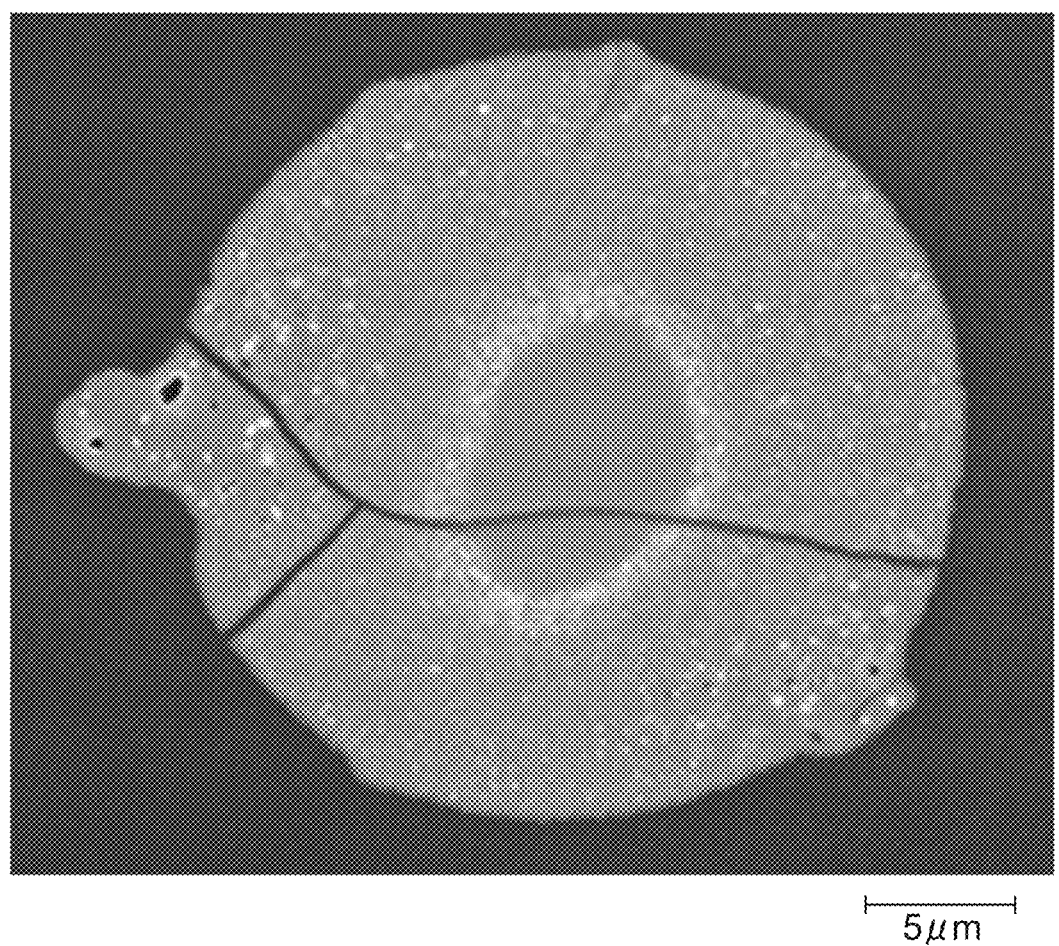
FIG. 19 shows a cross-sectional SEM image of the nanocomposite according to Example 8.

Further, the obtained sample is severed by a focused ion beam (FIB), and the cross section was observed by a scanning electron microscope (SEM). FIG. 19 shows a cross-sectional SEM image of the nanocomposite according to Example 8. As shown in FIG. 19, the nanocomposite was comprised of a matrix portion and white dot portions. A composition analysis of the respective portions by means of an energy dispersive X-ray (EDX) spectrometer attached to an SEM showed that the matrix portion is comprised of $SiO_2$, and the content of Ca and I in the white dot portions is relatively large.

Figure 20:
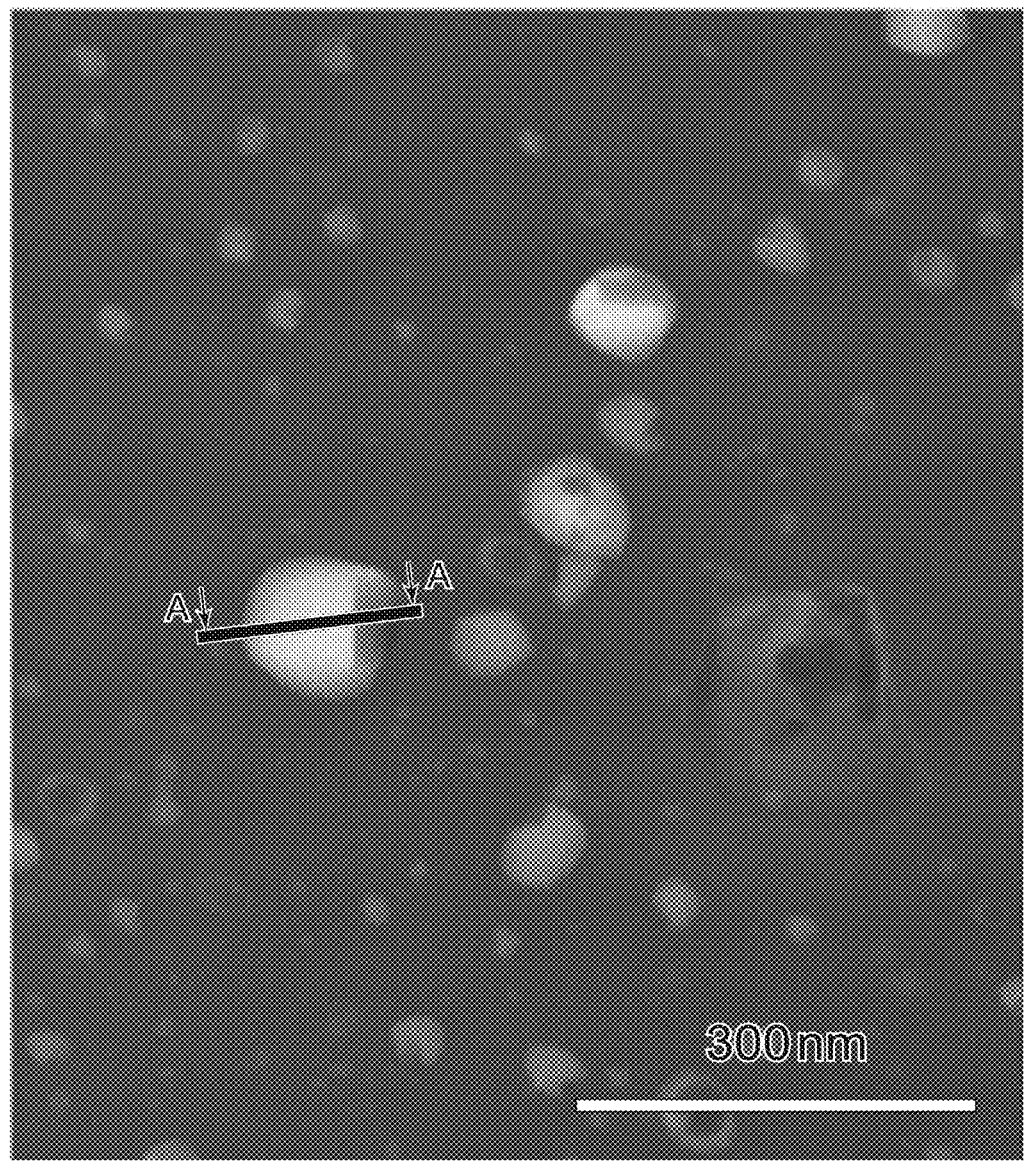
FIG. 20 shows a cross-sectional STEM image of the nanocomposite according to Example 8.
Figure 21:
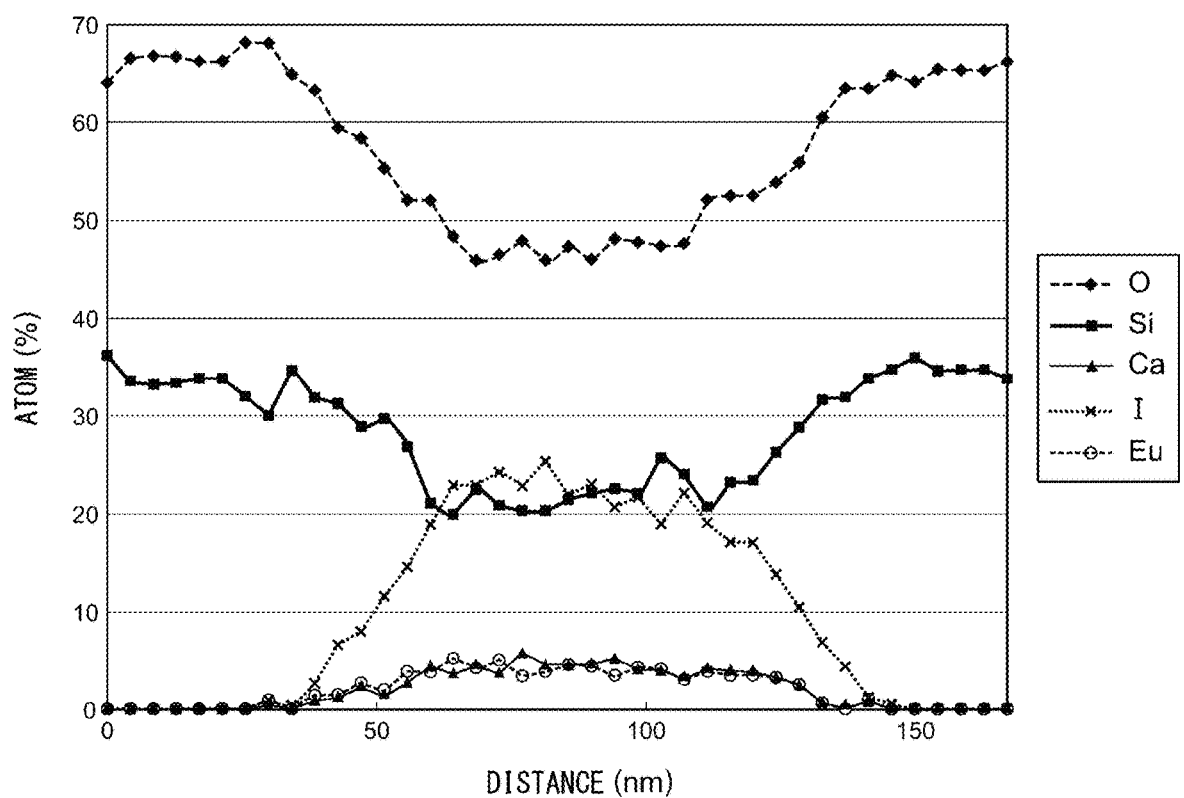
FIG. 21 shows a result of STEM-EDX composition analysis along a line A-A of FIG. 20.

The sample is sliced to a thickness of 60 nm by an FIB and was observed and analyzed by means of a scanning transmission electron microscope (STEM). FIG. 20 shows a cross-sectional STEM image of the nanocomposite according to Example 8. FIG. 21 shows a result of STEM-EDX composition analysis along a line A-A of FIG. 20. As shown in FIG. 20, the diameter of the white dot portions is about 50 nm. Further, the STEM-EDX line analysis showed that the content of Ca, I, and Eu in the white dot portions is larger than in surrounding areas.

Figure 22:
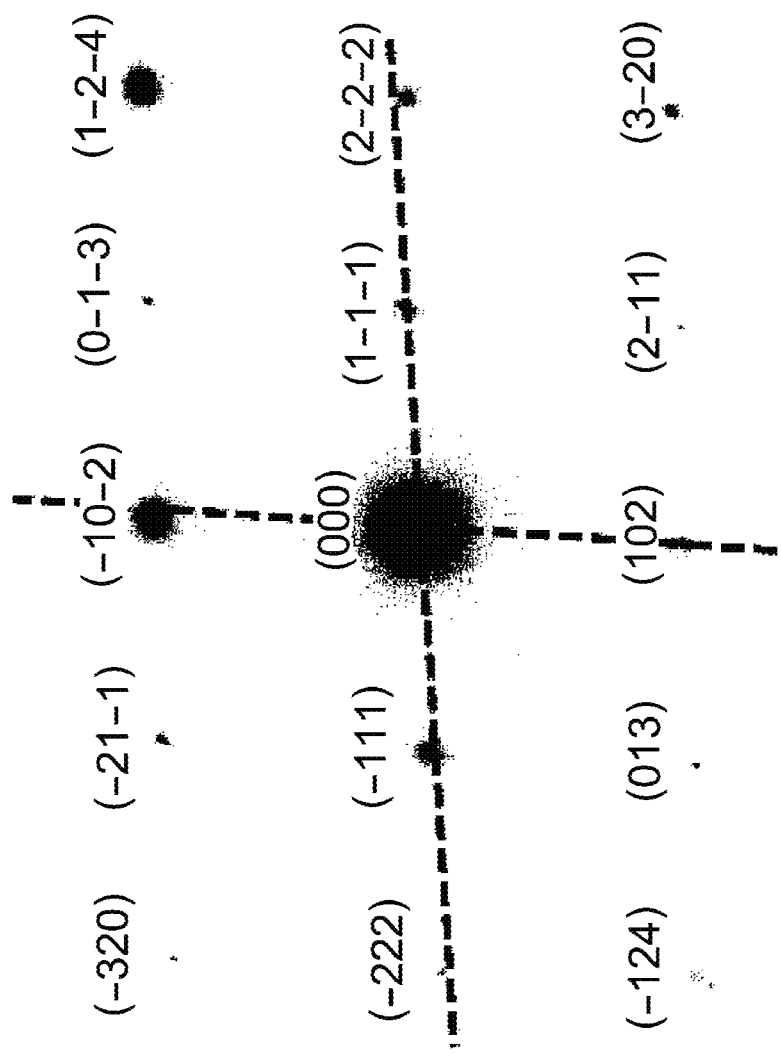
FIG. 22 shows an electron beam diffraction pattern of the white dot portions shown in FIG. 20.

FIG. 22 shows an electron beam diffraction pattern of the white dot portions shown in FIG. 20. Indexing shown in FIG. 22 is consistent in the case that the white dot portions are $CaI_2$ monocrystals so that it can be estimated that the white dot portions are. $CaI_2$ single nanocrystals. It was thus found that the particles shown in FIG. 19 represent a nanocomposite member in which heterogenous crystals form a sea-island structure.

Example 9

The nanocomposite according to Example 9 is embodied by a crystalline silica matrix that contains $SrCl_2:Eu^{2+}$ as a fluorescent component. To manufacture the nanocomposite, amorphous silica (average particle diameter 30 μm) having a crystallization temperature 1350° C., $SrCl_2$ (melting point 874° C.), and $EuCl_3$ were precisely weighted such that molar ratio thereof is 6/0.8/0.1 and were put into an alumina mortar in an Ar gas atmosphere to ground and mix the materials. The mixed powder was then put into an alumina crucible and calcinated at 1000° C. for 10 hours in a nitrogen atmosphere ($N_2=100$ vol %). After calcination, the powder was cleaned with hot pure water to remove excessive chlorides and obtain a sample of nanocomposite according to Example 9.

Figure 23:
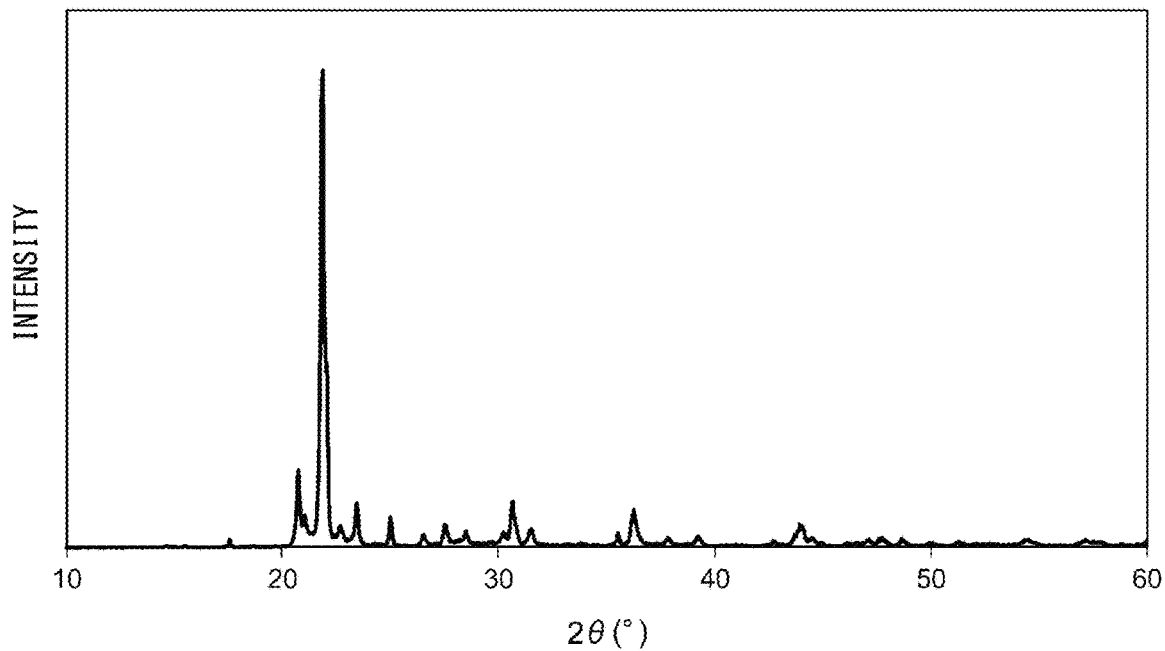
FIG. 23 shows an X-ray diffraction pattern of the nanocomposite according to Example 9.
Figure 24:
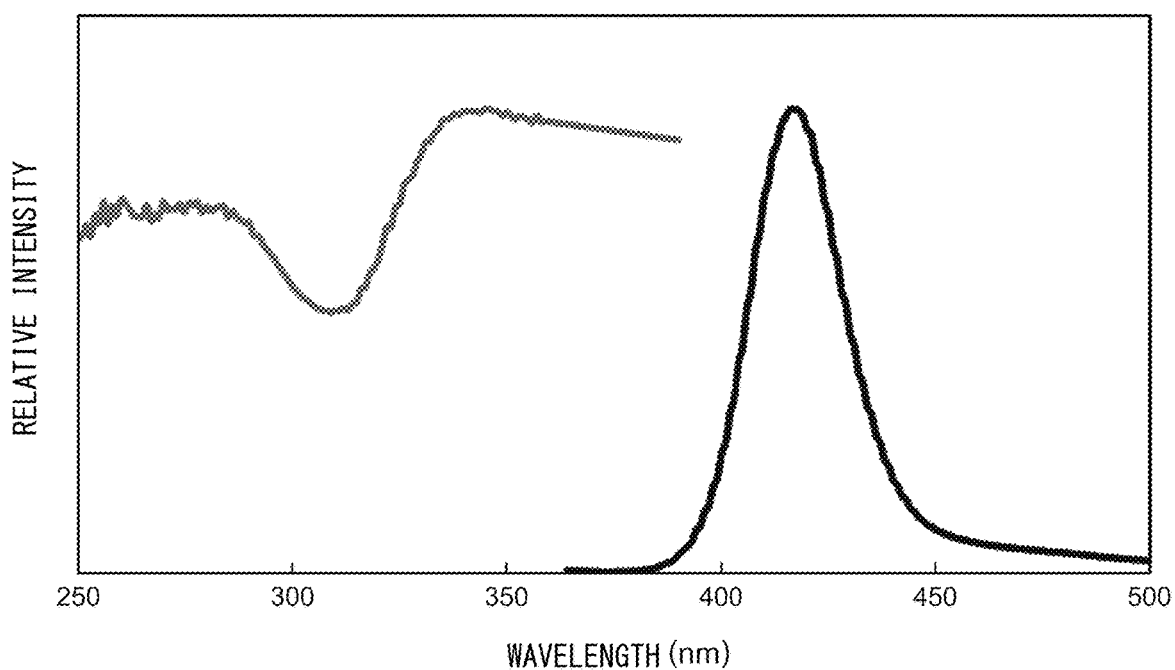
FIG. 24 shows an excitation spectrum and an emission spectrum of the nanocomposite phosphor according to Example 9.

Powder X-ray diffraction measurement was conducted on the sample thus obtained. FIG. 23 shows an X-ray diffraction pattern of the nanocomposite according to Example 9. An analysis of the peaks shown in FIG. 23 revealed that the nanocomposite according to Example 9 is a powder in which α-cristobalites and tridymites, which form a high-temperature crystal phase of silica, represent the main phase. Irradiation of the nanocomposite with an ultraviolet light having a peak wavelength of 365 nm resulted in observation of an ultraviolet light having a peak wavelength of 405 nm. FIG.

24 shows an excitation spectrum and an emission spectrum of the nanocomposite phosphor according to Example 9.

Example 10

The nanocomposite according to Example 10 is embodied by a crystalline silica matrix that contains $SrI_2:Eu^{2+}$ as a fluorescent component. To manufacture the nanocomposite, amorphous silica (average particle diameter 30 µm) having a crystallization temperature 1350° C., $SrI_2$ (melting point 402° C.), and $EuI_3$ were first precisely weighted such that molar ratio thereof is 6/0.8/0.1 and were put into an alumina mortar in an Ar gas atmosphere to ground and mix the materials. The mixed powder was then put into an alumina crucible and calcinated at 1000° C. for 10 hours in a hydrogen-containing nitrogen atmosphere (volume ratio $N_2/H_2=95/5$). After calcination, the powder was cleaned with hot pure water to remove excessive iodides and obtain a sample of nanocomposite according to Example 10.

Figure 25:
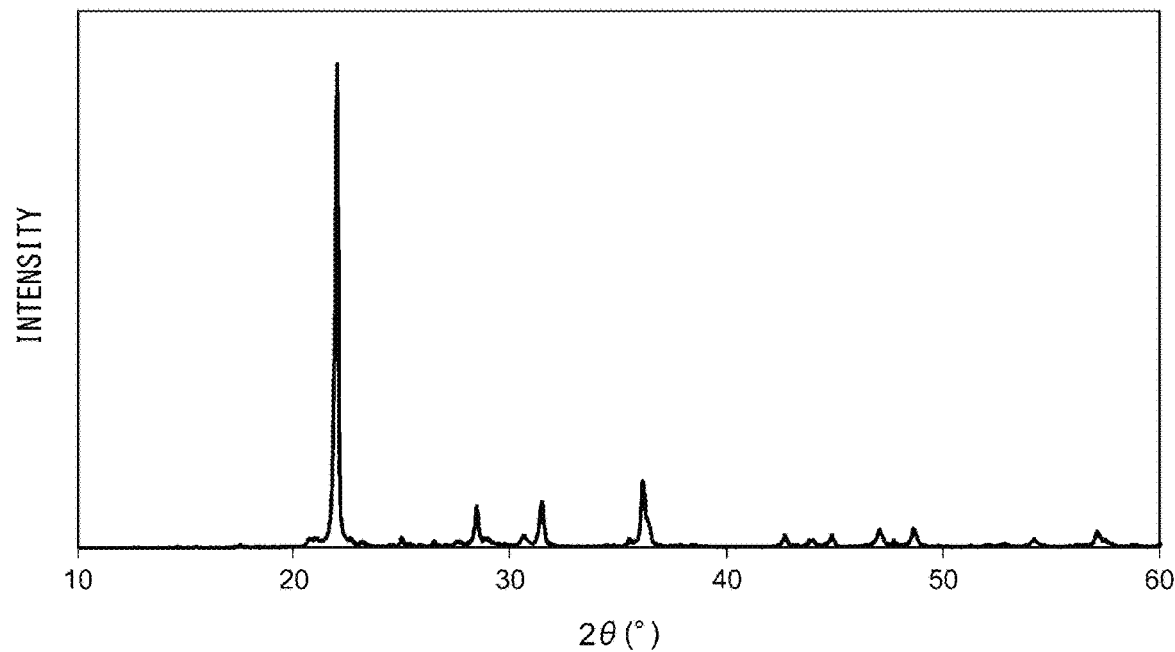
FIG. 25 shows an X-ray diffraction pattern of the nanocomposite according to Example 10.
Figure 26:
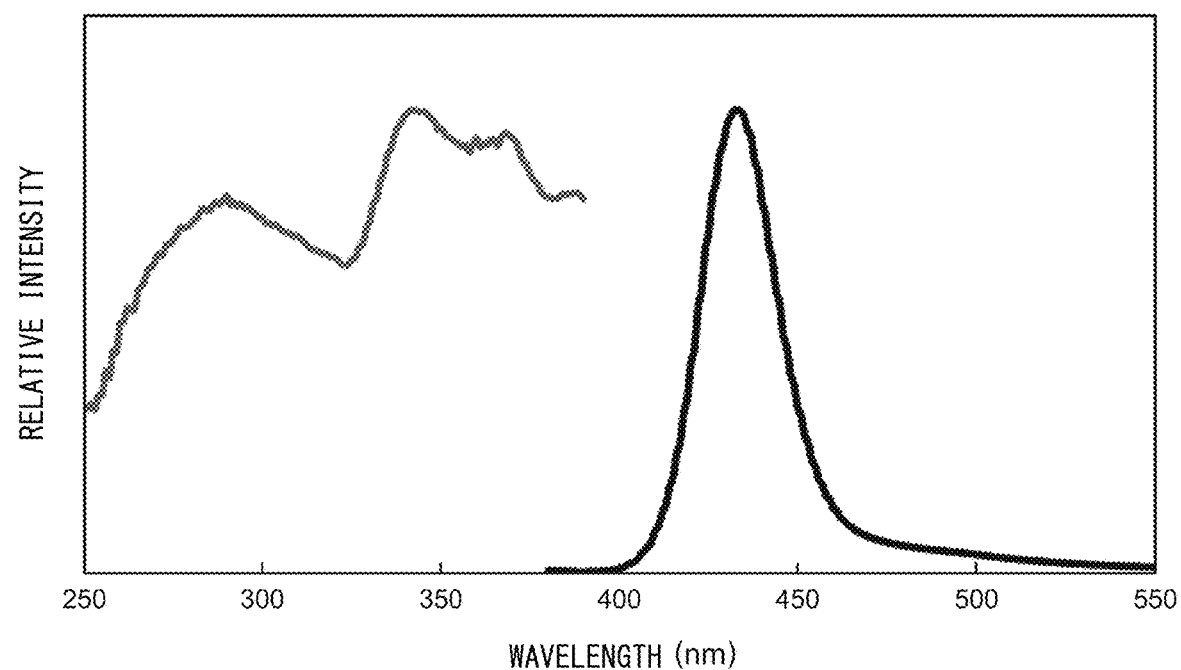
FIG. 26 shows an excitation spectrum and an emission spectrum of the nanocomposite phosphor according to Example 10.

Powder X-ray diffraction measurement was conducted on the sample thus obtained. FIG. 25 shows an X-ray diffraction pattern of the nanocomposite according to Example 10. An analysis of the peaks shown in FIG. 25 revealed that the nanocomposite according to Example 10 is a powder in which α-cristobalites, which form a high-temperature crystal phase of silica, represent the main phase. Irradiation of the nanocomposite with an ultraviolet light having a peak wavelength of 365 nm resulted in observation of a blue light having a peak wavelength of 430 nm. FIG. 26 shows an excitation spectrum and an emission spectrum of the nanocomposite according to Example 10.

Example 11

The nanocomposite according to Example 11 is embodied by a crystalline silica matrix that contains $SrBr_2:Eu^{2+}$ as a fluorescent component. To manufacture the nanocomposite, amorphous silica (average particle diameter 30 µm) having a crystallization temperature 1350° C., $SrBr_2$ (melting point 643° C.), and $EuBr_3$ were precisely weighted such that molar ratio thereof is 6/0.8/0.1 and were put into an alumina mortar in an Ar gas atmosphere to ground and mix the materials. The mixed powder was then put into an alumina crucible and calcinated at 1000° C. for 10 hours in a hydrogen-containing nitrogen atmosphere (volume ratio $N_2/H_2=95/5$). After calcination, the powder was cleaned with hot pure water to remove excessive bromides and obtain a sample of nanocomposite according to Example 11.

Figure 27:
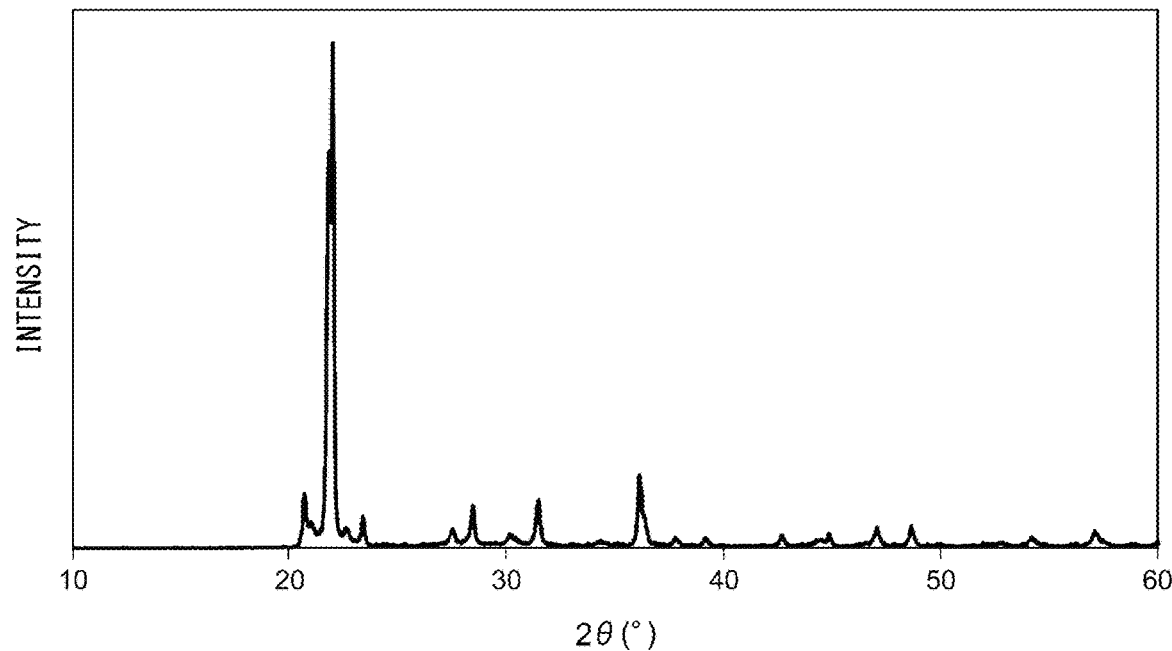
FIG. 27 shows an X-ray diffraction pattern of the nanocomposite according to Example 11.
Figure 28:
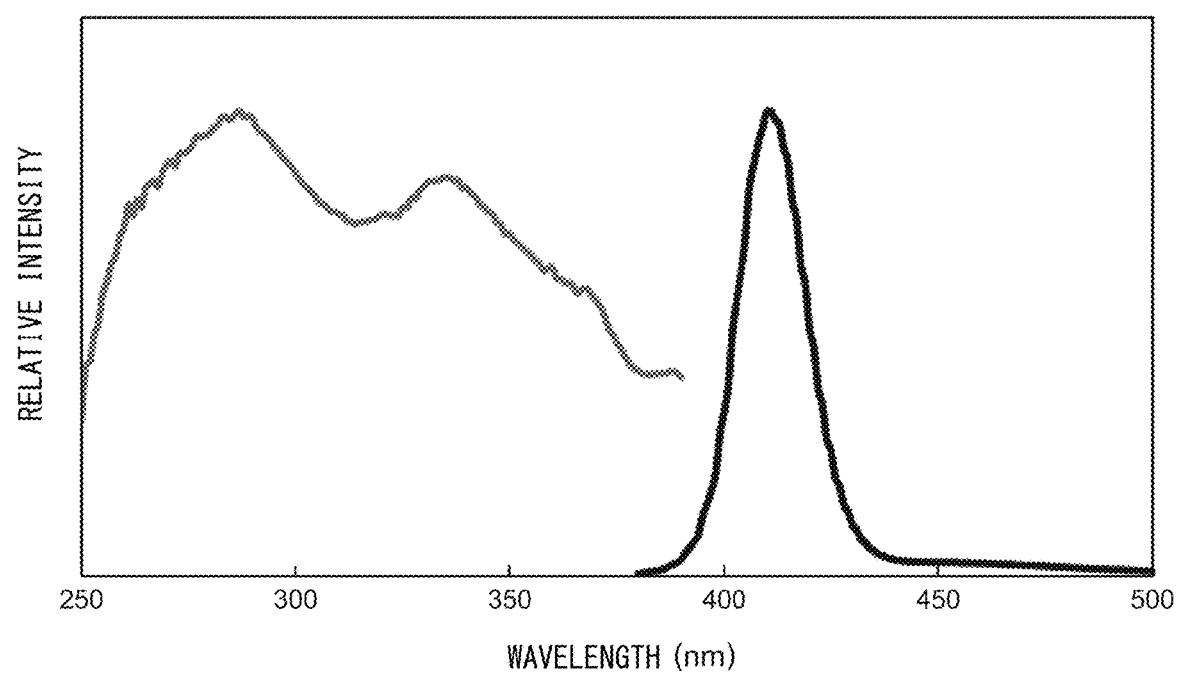
FIG. 28 shows an excitation spectrum and an emission spectrum of the nanocomposite according to Example 11.

Powder X-ray diffraction measurement was conducted on the sample thus obtained. FIG. 27 shows an X-ray diffraction pattern of the nanocomposite according to Example 11. An analysis of the peaks shown in FIG. 27 revealed that the nanocomposite according to Example 11 is a powder in which α-cristobalites and tridymites, which form a high-temperature crystal phase of represent the main phase. Irradiation of the nanocomposite with an ultraviolet light having a peak wavelength of 335 nm resulted in observation of a bluish-purple light having a peak wavelength of 410 nm. FIG. 28 shows an excitation spectrum and an emission spectrum of the nanocomposite according to Example 11.

Example 12

The nanocomposite according to Example 12 is embodied by a crystalline silica matrix that contains $MgCl_2:Eu^{2+}$ as a fluorescent component. To manufacture the nanocomposite, amorphous silica (average particle diameter 30 µm) having a crystallization temperature 1350° C., $MgCl_2$ (melting point 714° C.), and $EuCl_2$ are first precisely weighted such that molar ratio thereof is 6/0.8/0.1 and are put into an alumina mortar in an Ar gas atmosphere to ground and mix the materials. The mixed powder was then put into an alumina crucible and calcinated at 1000° C. for 10 hours in a hydrogen-containing nitrogen atmosphere (volume ratio $N_2/H_2=95/5$). After calcination, the powder was cleaned with hot pure water to remove excessive chlorides and obtain a sample of nanocomposite according to Example 12.

Figure 29:
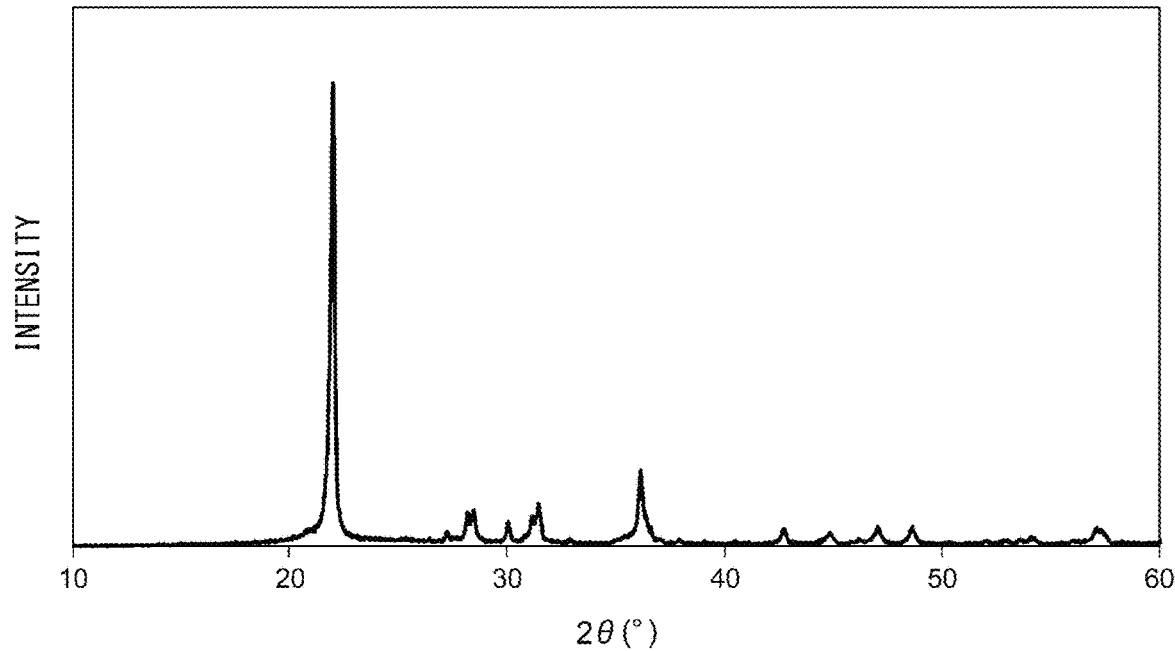
FIG. 29 shows an X-ray diffraction pattern of the nanocomposite according to Example 12.
Figure 30:
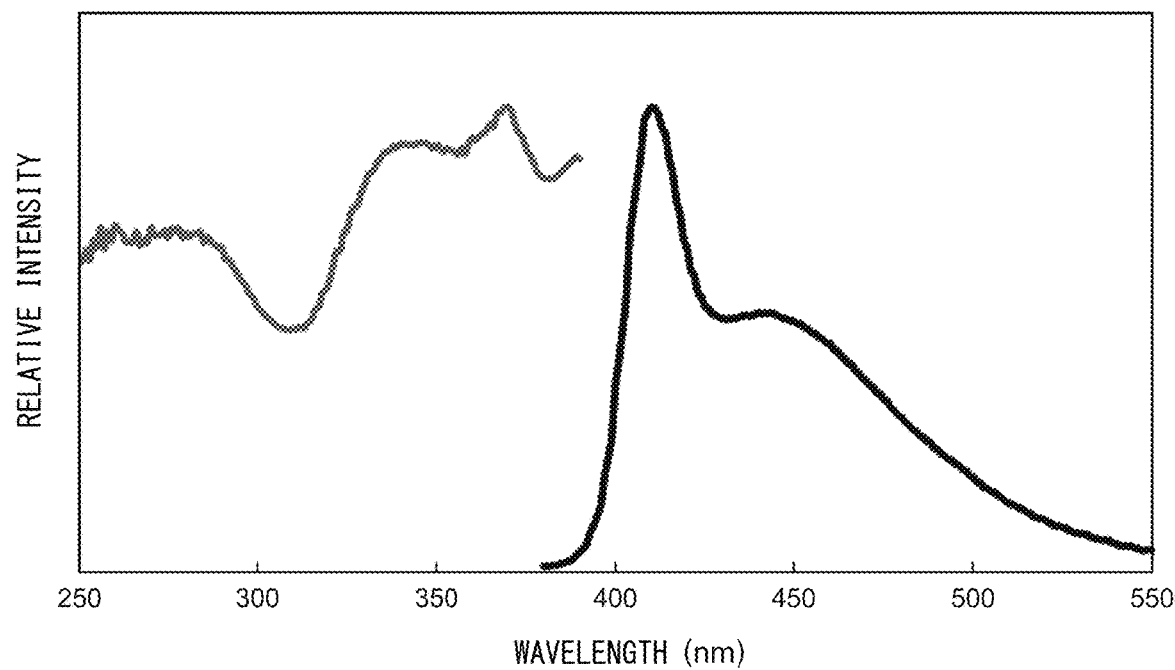
FIG. 30 shows an excitation spectrum and an emission spectrum of the nanocomposite according to Example 12.

Powder X-ray diffraction measurement was conducted on the sample thus obtained. FIG. 29 shows an X-ray diffraction pattern of the nanocomposite according to Example 12. An analysis of the peaks shown in FIG. 29 revealed that the nanocomposite according to Example 12 is a powder in which α-cristobalites, which form a high-temperature crystal phase of silica, represent the main phase. Irradiation of the nanocomposite with an ultraviolet light having a peak wavelength of 340 nm resulted in observation of a blue light having a peak wavelength at 410 nm and 440 nm. FIG. 30 shows an excitation spectrum and an emission spectrum of the nanocomposite according to Example 12.

Example 13

The nanocomposite according to Example 13 is embodied by a crystalline silica matrix that contains monocrystal fine particles as a magnetic component. To manufacture the nanocomposite, amorphous silica (average particle diameter 30 µm) having a crystallization temperature 1350° C., SnS (melting point 880° C.), and CoS (melting point 1100° C.) were first precisely weighted such that molar ratio thereof is 6/0.8/0.2 and were put into an alumina mortar in an Ar gas atmosphere to ground and mix the materials. The mixed powder was then put into an alumina crucible and calcinated at 1200° C. for 10 hours in an argon gas atmosphere (Ar=100 vol %). After calcination, the powder was cleaned with dilute hydrochloric acid to remove excessive sulfides and obtain a sample of nanocomposite according to Example 12.

Figure 31:
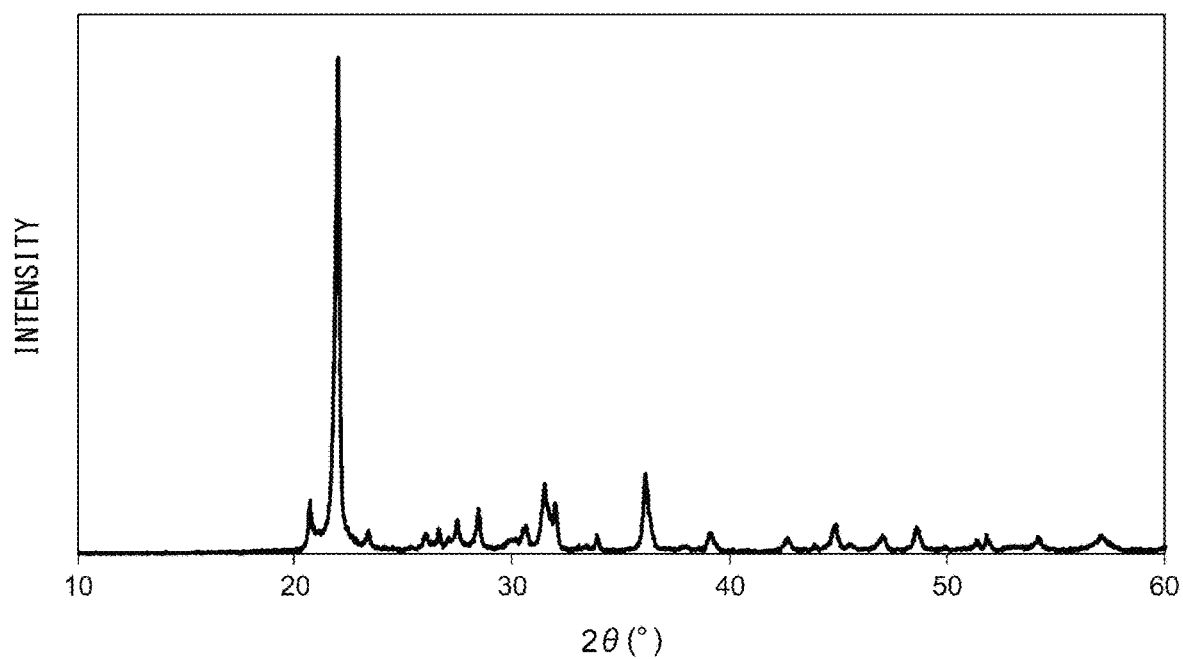
FIG. 31 shows an X-ray diffraction pattern of the nanocomposite according to Example 13.

Powder X-ray diffraction measurement was conducted on the sample thus obtained. FIG. 31 shows an X-ray diffraction pattern of the nanocomposite according to Example 13. An analysis of the peaks shown in FIG. 31 revealed that the nanocomposite according to Example 13 is a powder in which α-cristobalites, which form a high-temperature crystal phase of silica, represent the main phase. Further, the nanocomposite particles thus obtained were magnetic and attracted by a magnet. In other words, it was demonstrated that single nanocrystals dispersed in the nanocomposite according to the embodiment function as a magnetic body or another functional area as well as a phosphor.

Nanopolycrystals may be dispersed in the matrix phase instead of single nanocrystals so long as the compound can exhibit the function.

Described above is an explanation based on an exemplary embodiment. The embodiment is intended to be illustrative only and it will be understood by those skilled in the art that various modifications to constituting elements and processes could be developed and that such modifications are also within the scope of the present invention.

What is claimed is:
1. A nanocomposite comprising:
a matrix phase; and
a functional area disposed in the matrix phase, wherein the functional area contains monocrystal fine particles, and the monocrystal fine particles are a phosphor represented by $M^{II}X_2$:Re where $M^{II}$ is one or more elements selected from the group consisting of Mg, Ca, Sr, Ba, Cd, Zn, and Mn, X is one or more elements selected from the group consisting of Cl and I, and Re is one or more elements selected from the group consisting of the rare-earth elements.

2. The nanocomposite according to claim 1, wherein the functional area is localized in a crystal area in which a portion of the matrix phase is crystallized.

3. The nanocomposite according to claim 2, wherein the matrix phase is made of silica, and the crystal area has a cristobalite structure in which a portion of the silica is crystallized.

4. The nanocomposite according to claim 1, wherein the monocrystal fine particles may be particles of a deliquescent compound.

5. The nanocomposite according to claim 1, wherein the fine particles have an average particle diameter of 1~100 nm.

6. The nanocomposite according to claim 1, wherein the matrix has an amorphous area and a crystal area, the amorphous area being located in the center of the matrix phase and the crystal area being located outward from the center of the matrix phase and the functional area is formed between the amorphous area and the crystal area.

7. A nanocomposite comprising:
a matrix phase; and
a functional area disposed in the matrix phase, wherein the functional area contains monocrystal fine particles, and
the monocrystal fine particles are a phosphor represented by $M^{II}$S:Re where $M^{II}$ is one or more elements selected from the group consisting of Mg, Ca, Sr, Ba, Cd, Zn, and Mn, and Re is one or more elements selected from the group consisting of the rare-earth elements.

8. A method of manufacturing a nanocomposite comprising:
placing one or more compounds as base materials for a phosphor on a surface of a member used as a matrix phase; and
heating a composite while the compounds are placed on the surface of the member, wherein
an arithmetic mean roughness Ra of the surface of the member is 5~20 μm.

* * * * *